(12) United States Patent
Cooper et al.

(10) Patent No.: US 11,748,309 B2
(45) Date of Patent: *Sep. 5, 2023

(54) SYSTEM AND METHOD FOR ERROR-RESILIENT DATA REDUCTION

(71) Applicant: AtomBeam Technologies Inc., Moraga, CA (US)

(72) Inventors: Joshua Cooper, Columbia, SC (US); Aliasghar Riahi, Orinda, CA (US); Mojgan Haddad, Orinda, CA (US); Ryan Kourosh Riahi, Orinda, CA (US); Razmin Riahi, Orinda, CA (US); Charles Yeomans, Orinda, CA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,907

(22) Filed: Dec. 9, 2022

(65) Prior Publication Data

US 2023/0177013 A1 Jun. 8, 2023

Related U.S. Application Data

(63) Continuation of application No. 17/233,813, filed on Apr. 19, 2021, now Pat. No. 11,550,756, which is a continuation-in-part of application No. 17/180,439, filed on Feb. 19, 2021, now Pat. No. 11,366,790, which is a continuation-in-part of application No. 16/923,039, filed on Jul. 7, 2020, now Pat. No. 11,232,076, which is a continuation-in-part of application No. 16/716,098, filed on Dec. 16, 2019, now Pat. No. 10,706,018, said application No. 16/716,098 is a continuation of application No.

(Continued)

(51) Int. Cl.
*G06F 16/174* (2019.01)
*G06F 3/06* (2006.01)

(52) U.S. Cl.
CPC .......... *G06F 16/1752* (2019.01); *G06F 3/067* (2013.01); *G06F 3/0608* (2013.01); *G06F 3/0641* (2013.01)

(58) Field of Classification Search
None
See application file for complete search history.

(56) References Cited

U.S. PATENT DOCUMENTS

| 5,850,482 A | 12/1998 | Meany et al. |
| 8,453,040 B2 | 5/2013 | Henderson, Jr. et al. |

(Continued)

*Primary Examiner* — Michael Alsip
(74) *Attorney, Agent, or Firm* — Galvin Patent Law LLC; Brian R. Galvin

(57) ABSTRACT

A system and method for error-resilient data reduction, utilizing a phase detector, a data requestor, a multi-phase trainer, a reconstruction engine, a deconstruction engine, and one or more reference codebooks. A multi-phase trainer may be used to train the reconstruction and deconstruction engines on various phase sourceblocks in order recover quickly from corrupted data files that cause the phase alignment of the sourceblocks to become out of phase. A phase detector may determine when the sourceblocks get out of phase and when the return to in-phase by checking if a predetermined threshold probability of correct encoding is met. Data requestor may request for retransmission only the data that was received out of phase.

8 Claims, 39 Drawing Sheets

Related U.S. Application Data

16/455,655, filed on Jun. 27, 2019, now Pat. No. 10,509,771, which is a continuation-in-part of application No. 16/200,466, filed on Nov. 26, 2018, now Pat. No. 10,476,519, which is a continuation-in-part of application No. 15/975,741, filed on May 9, 2018, now Pat. No. 10,303,391.

(60) Provisional application No. 63/140,111, filed on Jan. 21, 2021, provisional application No. 63/027,166, filed on May 19, 2020, provisional application No. 62/926,723, filed on Oct. 28, 2019, provisional application No. 62/578,824, filed on Oct. 30, 2017.

(56) References Cited

U.S. PATENT DOCUMENTS

| | | |
|---|---|---|
| 9,397,706 B1 | 7/2016 | Steiner et al. |
| 10,255,315 B2 | 4/2019 | Kalevo et al. |
| 11,003,533 B2 | 5/2021 | Zhang et al. |
| 2019/0220356 A1 | 7/2019 | Zhang et al. |

SYSTEM AND METHOD FOR ERROR-RESILIENT DATA REDUCTION

CROSS-REFERENCE TO RELATED APPLICATIONS

Priority is claimed in the application data sheet to the following patents or patent applications, each of which is expressly incorporated herein by reference in its entirety:
Ser. No. 17/233,813
Ser. No. 17/180,439
63/140,111
Ser. No. 16/923,039
63/027,166
Ser. No. 16/716,098
Ser. No. 16/455,655
Ser. No. 16/200,466
Ser. No. 15/975,741
62/578,824
62/926,723

BACKGROUND OF THE INVENTION

Field of the Invention

The present invention is in the field of computer data storage and transmission, and in particular to the field of error self-correction of compacted data files.

Discussion of the State of the Art

As computers become an ever-greater part of our lives, and especially in the past few years, data storage has become a limiting factor worldwide. Prior to about 2010, the growth of data storage far exceeded the growth in storage demand. In fact, it was commonly considered at that time that storage was not an issue, and perhaps never would be, again. In 2010, however, with the growth of social media, cloud data centers, high tech and biotech industries, global digital data storage accelerated exponentially, and demand hit the zettabyte (1 trillion gigabytes) level. Current estimates are that data storage demand will reach 50 zettabytes by 2020. By contrast, digital storage device manufacturers produced roughly 1 zettabyte of physical storage capacity globally in 2016. We are producing data at a much faster rate than we are producing the capacity to store it. In short, we are running out of room to store data, and need a breakthrough in data storage technology to keep up with demand.

The primary solutions available at the moment are the addition of additional physical storage capacity and data compression. As noted above, the addition of physical storage will not solve the problem, as storage demand has already outstripped global manufacturing capacity. Data compression is also not a solution. A rough average compression ratio for mixed data types is 2:1, representing a doubling of storage capacity. However, as the mix of global data storage trends toward multi-media data (audio, video, and images), the space savings yielded by compression either decreases substantially, as is the case with lossless compression which allows for retention of all original data in the set, or results in degradation of data, as is the case with lossy compression which selectively discards data in order to increase compression. Even assuming a doubling of storage capacity, data compression cannot solve the global data storage problem. The method disclosed herein, on the other hand, works the same way with any type of data.

Transmission bandwidth is also increasingly becoming a bottleneck. Large data sets require tremendous bandwidth, and we are transmitting more and more data every year between large data centers. On the small end of the scale, we are adding billions of low bandwidth devices to the global network, and data transmission limitations impose constraints on the development of networked computing applications, such as the "Internet of Things".

Furthermore, as quantum computing becomes more and more imminent, the security of data, both stored data and data streaming from one point to another via networks, becomes a critical concern as existing encryption technologies are placed at risk.

Additionally, a large plurality of our data travels over communication channels which are very noisy and which may therefore corrupt messages. Traditionally, error-correcting codes have been used to deal with this problem, allowing a certain amount of noise to be corrected (or at least detected) when errors occur. However, this solution introduces several problems: it costs time and energy to send the extra bits needed to encode data this way, it costs time, energy, and processing power to perform the encoding and decoding used for error-correction, and data which cannot be read until it is transmitted with 100% integrity, such as most compressed file protocols/formats, must wait until all errors are corrected for it to be useful, introducing potentially enormous latencies or forcing the user to waste precious storage and bandwidth by discarding and/or retransmitting corrupted data.

What is needed is a system and method for providing error-resilient data reduction, which allows for automatic self-correction of corrupted data sent over a noisy communication channel.

SUMMARY OF THE INVENTION

A system and method for error-resilient data reduction, utilizing a phase detector, a data requestor, a multi-phase trainer, a reconstruction engine, a deconstruction engine, and one or more reference codebooks. A multi-phase trainer may be used to train the reconstruction and deconstruction engines on various phase sourceblocks in order recover quickly from corrupted data files that cause the phase alignment of the sourceblocks to become out of phase. A phase detector may determine when the sourceblocks get out of phase and when the return to in-phase by checking if a predetermined threshold probability of correct encoding is met. Data requestor may request for retransmission only the data that was received out of phase.

According to a preferred embodiment, a system for error-resilient data reduction is disclosed, comprising: a computing device comprising a memory, a processor, and a non-volatile data storage device; at least one reference codebook comprising key-value pairs of data; a data deconstruction engine comprising a first plurality of programming instructions stored in the memory of, and operating on a processor of, the computing device, wherein the first plurality of programming instructions, when operating on the processor, cause the computing device to: train an encoding algorithm on sourceblocks at multiple phases; receive data from a data source; optimally deconstruct the incoming data into a plurality of chunklets; encode the data using the encoding algorithm and the reference codebook; and send the encoded data to a data reconstruction engine; and a data reconstruction engine comprising a second plurality of programming instructions stored in the memory of, and operating on a processor of, the computing device, wherein the second plurality of programming instructions, when operating on the processor, cause the computing device to: receive encoded data; decode the data using the key-value pairs stored within the reference codebook; determine if the decoded data has exceeded a predetermined threshold probability, wherein the decoded data is in-phase if the threshold is exceeded and the decoded data is out-of-phase if the threshold is not exceeded; and request retransmission of out-of-phase data.

According to another preferred embodiment, a method for error-resilient data reduction is disclosed, comprising the steps of: training an encoding algorithm on sourceblocks at multiple phases; receiving data from a data source; optimally deconstructing the incoming data into a plurality of chunklets; encoding the data using the encoding algorithm and the reference codebook; sending the encoded data to a data reconstruction engine; receiving encoded data; decoding the data using the key-value pairs stored within the reference codebook; determining if the decoded data has exceeded a predetermined threshold probability, wherein the decoded data is in-phase if the threshold is exceeded and the decoded data is out-of-phase if the threshold is not exceeded; and requesting retransmission of out-of-phase data.

According to one aspect, wherein the threshold probability is determined using logistic regression.

According to one aspect, wherein the multiple phases refers to byte-phase sourceblocks with an offset.

According to one aspect, wherein the offset is an integer value in the inclusive range of 1 to 7.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
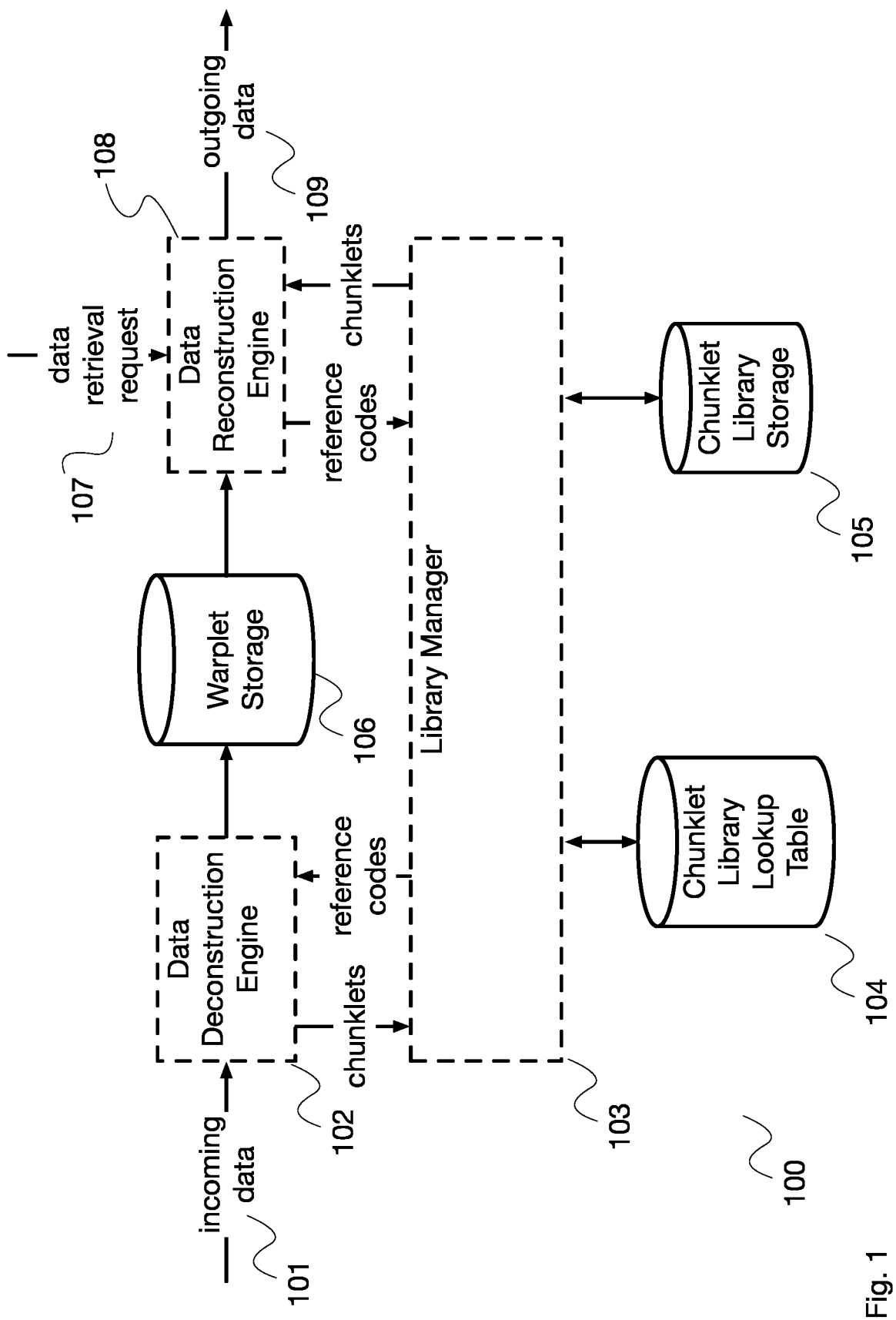
FIG. 1 is a diagram showing an embodiment of the system in which all components of the system are operated locally.

A system and method for error-resilient data reduction, utilizing a phase detector, a data requestor, a multi-phase trainer, a reconstruction engine, a deconstruction engine, and one or more reference codebooks. A multi-phase trainer may be used to train the reconstruction and deconstruction engines on various phase sourceblocks in order recover quickly from corrupted data files that cause the phase alignment of the sourceblocks to become out of phase. A phase detector may determine when the sourceblocks get out of phase and when the return to in-phase by checking if a predetermined threshold probability of correct encoding is met. Data requestor may request for retransmission only the data that was received out of phase.

The disclosed data compaction system may automatically self-correct after an error, with no additional latency, processing power, or bandwidth use. After a system encoded data stream encounters a bit-flip error, it is only a short while before the decoding process, with no additional user intervention, returns to a state of correctly decoding to the original data until another such error is encountered. Only a short burst of incorrect bits will be recorded by the user, and can be corrected if necessary by requesting retransmission of only this small amount of data, instead of an entire, potentially massive file.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "byte" refers to a series of bits exactly eight bits in length.

The terms "compression" and "deflation" as used herein mean the representation of data in a more compact form than the original dataset. Compression and/or deflation may be either "lossless", in which the data can be reconstructed in its original form without any loss of the original data, or "lossy" in which the data can be reconstructed in its original form, but with some loss of the original data.

The terms "compression factor" and "deflation factor" as used herein mean the net reduction in size of the compressed data relative to the original data (e.g., if the new data is 70% of the size of the original, then the deflation/compression factor is 30% or 0.3.)

The terms "compression ratio" and "deflation ratio", and as used herein all mean the size of the original data relative to the size of the compressed data (e.g., if the new data is 70% of the size of the original, then the deflation/compression ratio is 70% or 0.7.)

The term "data" means information in any computer-readable form.

The term "chunklet" refers to a series of bits of a specified length. The number of bits in a chunklet may be dynamically optimized by the system during operation. In one aspect, a chunklet may be of the same length as the block size used by a particular file system, typically 512 bytes or 4,096 bytes.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

The term "effective compression" or "effective compression ratio" refers to the additional amount data that can be stored using the method herein described versus conventional data storage methods. Although the method herein described is not data compression, per se, expressing the additional capacity in terms of compression is a useful comparison.

The term "data set" refers to a grouping of data for a particular purpose. One example of a data set might be a word processing file containing text and formatting information.

The term "library" refers to a database containing chunklets each with a pattern of bits and reference code unique within that library. The term "codebook" is synonymous with the term library.

The term "warplet" refers to a reference code form in which data is stored or transmitted in an aspect of the system. A warplet consists of a reference code or "codeword" to a chunklet in the library plus an indication of that chunklet's location in a particular data set.

Conceptual Architecture

FIG. 1 is a diagram showing an embodiment 100 of the system in which all components of the system are operated locally. As incoming data 101 is received by data deconstruction engine 102. Data deconstruction engine 102 breaks the incoming data into chunklets, which are then sent to library manager 103. Using the information contained in chunklet library lookup table 104 and chunklet library storage 105, library manager 103 returns reference codes to data deconstruction engine 102 for processing into warplets, which are stored in warplet storage 106. When a data retrieval request 107 is received, data reconstruction engine 108 obtains the warplets associated with the data from warplet storage 106, and sends them to library manager 103. Library manager 103 returns the appropriate chunklets to data reconstruction engine 108, which assembles them into the proper order and sends out the data in its original form 109.

Figure 2:
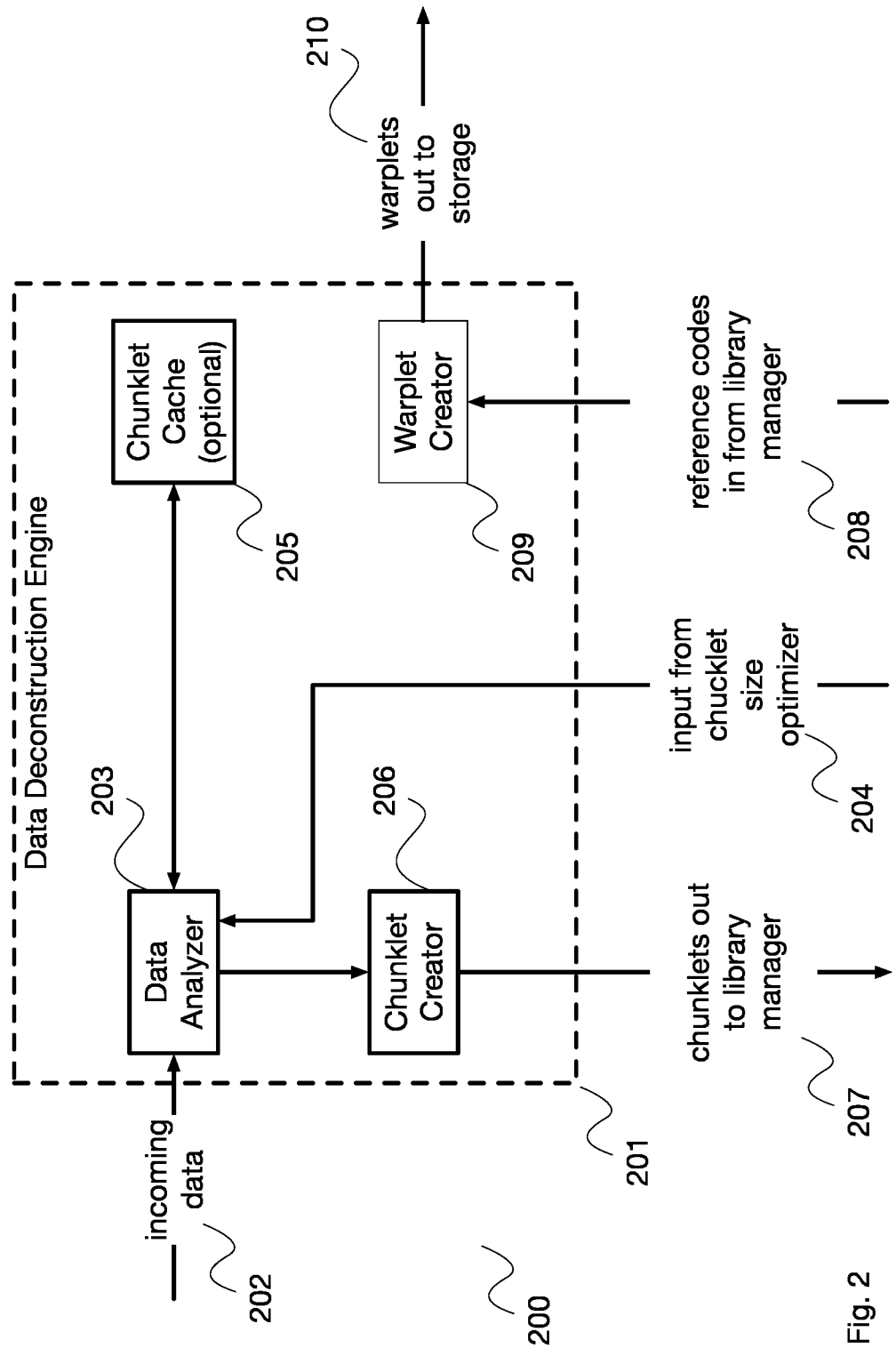
FIG. 2 is a diagram showing an embodiment of one aspect of the system, the data deconstruction engine.

FIG. 2 is a diagram showing an embodiment of one aspect 200 of the system, specifically data deconstruction engine 201. Incoming data 202 is received by data analyzer 203, which optimally analyzes the data based on machine learning algorithms and input 204 from a chunklet size optimizer, which is disclosed below. Data analyzer may optionally have access to a chunklet cache 205 of recently-processed chunklets, which can increase the speed of the system by avoiding processing in library manager 103. Based on information from data analyzer 203, the data is broken into chunklets by chunklet creator 206, which sends chunklets 207 to library manager 203 for additional processing. Data deconstruction engine 201 receives reference codes 208 from library manager 103, corresponding to the chunklets in the library that match the chunklets sent by chunklet creator 206, and warplet creator 209 processes the reference codes into warplets comprising a reference code to a chunklet and a location of that chunklet within the data set. The original data may be discarded, and the warplets representing the data are sent out to storage 210.

Figure 3:
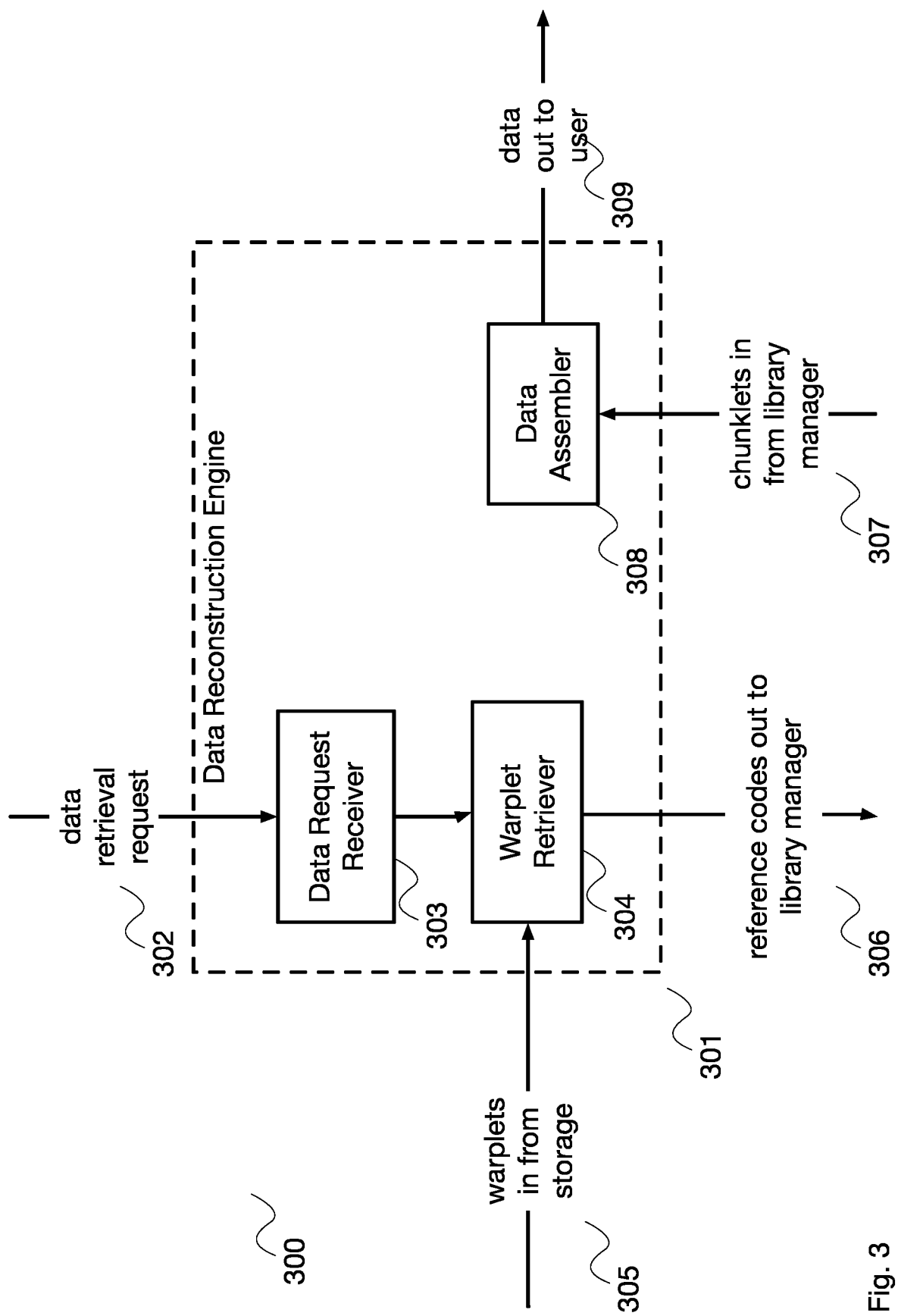
FIG. 3 is a diagram showing an embodiment of one aspect of the system, the data reconstruction engine.

FIG. 3 is a diagram showing an embodiment of another aspect of system 300, specifically data reconstruction engine 301. When a data retrieval request 302 is received by data request receiver 303 (in the form of a plurality of warplets corresponding to a desired final data set), it passes the information to data retriever 304, which obtains the requested data 305 from storage. Data retriever 304 sends, for each warplet received, a reference codes from the warplet 306 to library manager 103 for retrieval of the specific chunklet associated with the reference code. Data assembler 308 receives the chunklet 307 from library manager 103 and, after receiving a plurality of chunklets corresponding to a plurality of warplets, assembles them into the proper order based on the location information contained in each warplet (recall each warplet comprises a chunklet reference code and a location identifier that specifies where in the resulting data set the specific chunklet should be restored to. The requested data is then sent to user 309 in its original form.

Figure 4:
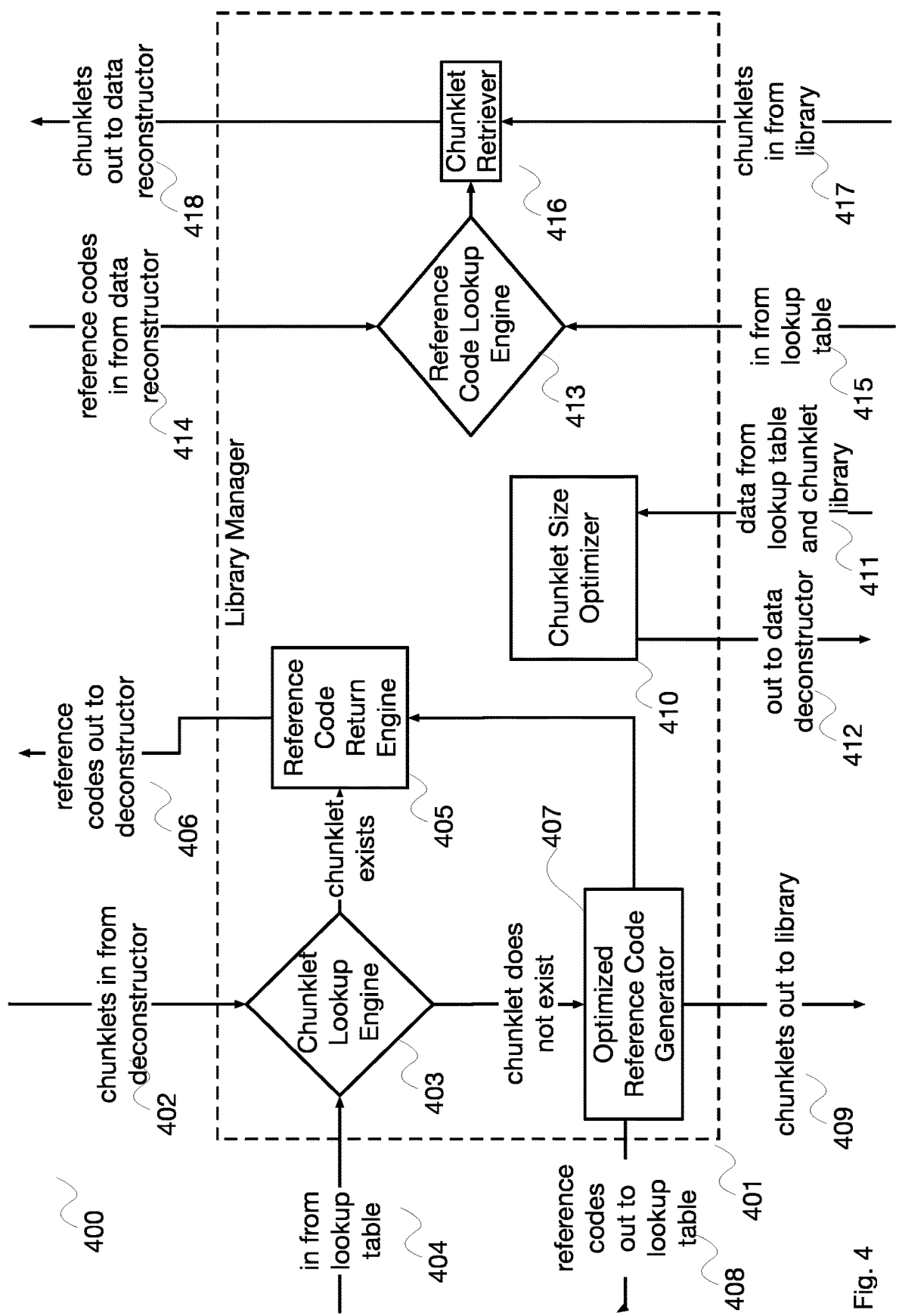
FIG. 4 is a diagram showing an embodiment of one aspect of the system, the library management module.

FIG. 4 is a diagram showing an embodiment of another aspect of the system 400, specifically library manager 401. One function of library manager 401 is to generate reference codes from chunklets received from data deconstruction engine 301. As chunklets are received 402 from data deconstruction engine 301, chunklet lookup engine 403 checks chunklet library lookup table 404 to determine whether those chunklets already exist in chunklet library storage 105. If a particular chunklet exists in chunklet library storage 105, reference code return engine 405 sends the appropriate reference code 406 to data deconstruction engine 301. If the chunklet does not exist in chunklet library storage 105, optimized reference code generator 407 generates a new, optimized reference code based on machine learning algorithms. Optimized reference code generator 407 then saves the reference code 408 to chunklet library lookup table 104; saves the associated chunklet 409 to chunklet library storage 105; and passes the reference code to reference code return engine 405 for sending 406 to data deconstruction engine 301. Another function of library manager 401 is to optimize the size of chunklets in the system. Based on information 411 contained in chunklet library lookup table 104, chunklet size optimizer 410 dynamically adjusts the size of chunklets in the system based on machine learning algorithms and outputs that information 412 to data analyzer 203. Another function of library manager 401 is to return chunklets associated with reference codes received from data reconstruction engine 301. As reference codes are received 414 from data reconstruction engine 301, reference code lookup engine 413 checks chunklet library lookup table 415 to identify the associated chunklets; passes that information to chunklet retriever 416, which obtains the chunklets 417 from chunklet library storage 105; and passes them 418 to data reconstruction engine 301.

Figure 5:
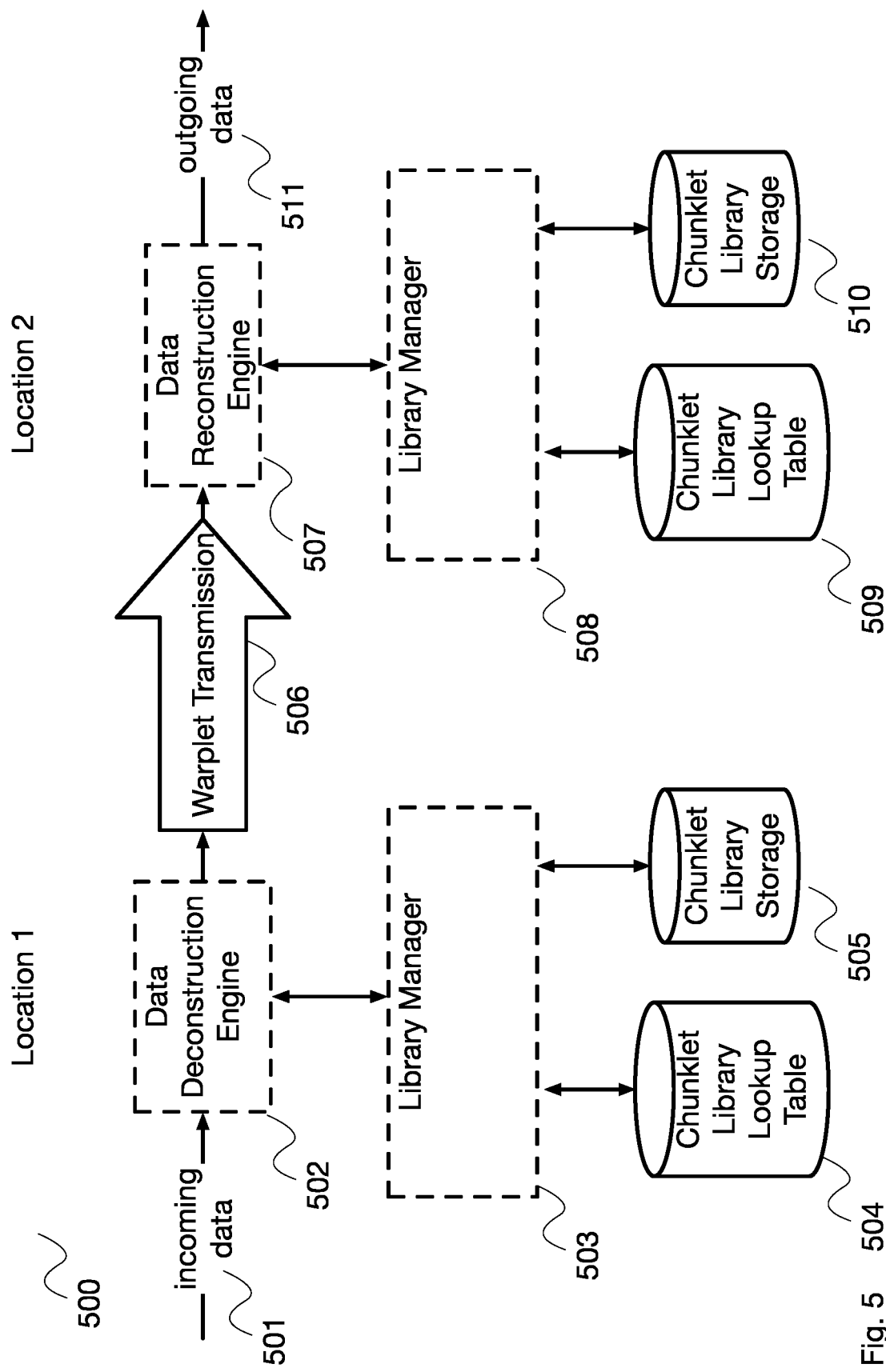
FIG. 5 is a diagram showing another embodiment of the system in which data is transferred between remote locations.

FIG. 5 is a diagram showing another embodiment of system 500, in which data is transferred between remote locations. As incoming data 501 is received by data deconstruction engine 502 at Location 1, data deconstruction engine 301 breaks the incoming data into chunklets, which are then sent to library manager 503 at Location 1. Using the information contained in chunklet library lookup table 504 at Location 1 and chunklet library storage 505 at Location 1, library manager 503 returns reference codes to data deconstruction engine 301 for processing into warplets, which are transmitted 506 to data reconstruction engine 507 at Location 2. In the case where the reference codes contained in a particular warplet have been newly generated by library manager 503 at Location 1, the warplet is transmitted along with a copy of the associated chunklet. As data reconstruction engine 507 at Location 2 receives the warplets, it passes them to library manager module 508 at Location 2, which looks up the chunklet in chunklet library lookup table 509 at Location 2 and retrieves the associated from chunklet library storage 510. Where the chunklet has been transmitted along with a warplet, the chunklet is stored in chunklet library storage 510 and chunklet library lookup table 504 is updated. Library manager 503 returns the appropriate chunklets to data reconstruction engine 507, which assembles them into the proper order and sends the data in its original form 511.

Figure 6:
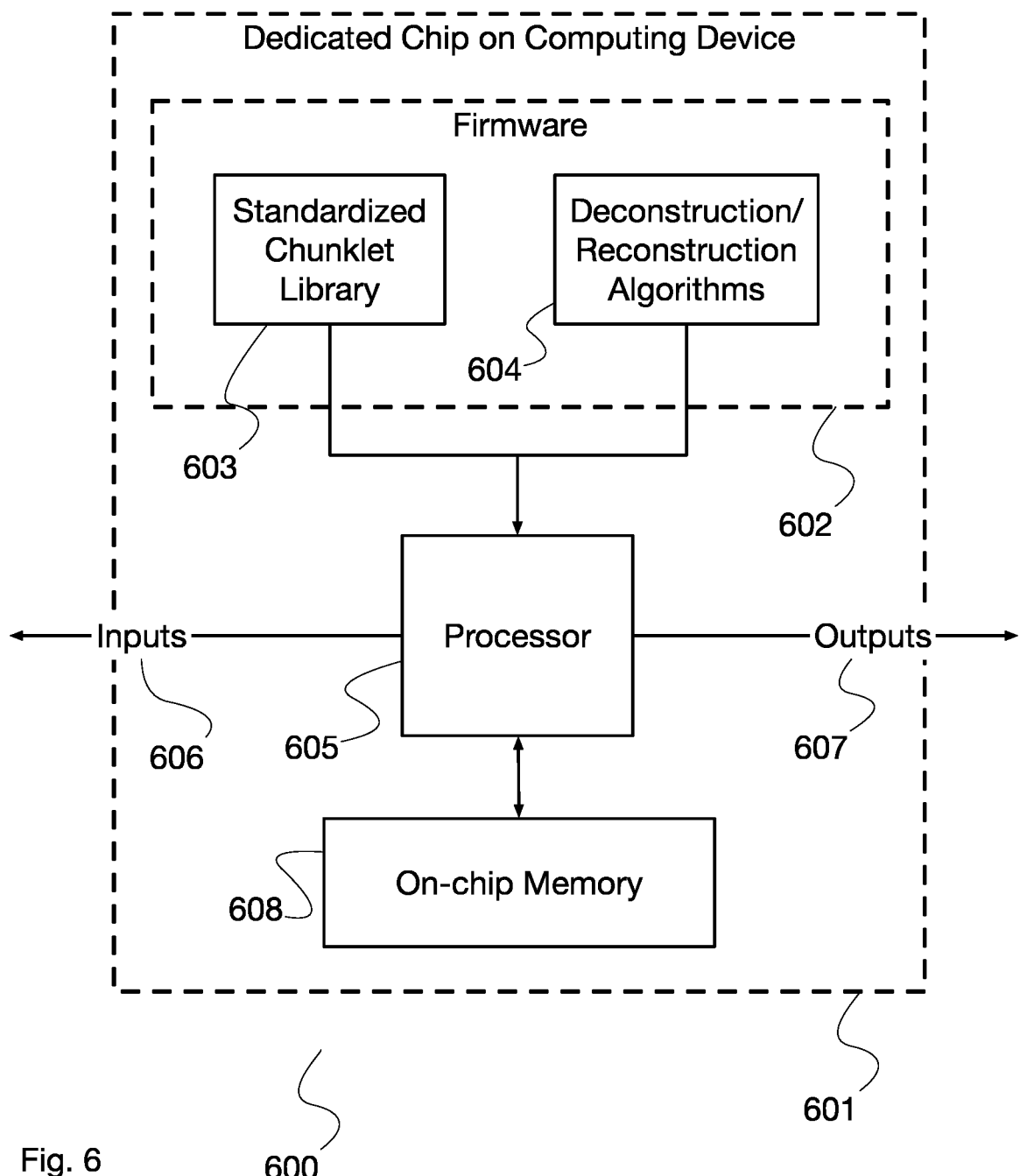
FIG. 6 is a diagram showing an embodiment in which a standardized version of the chunklet library and associated algorithms would be encoded as firmware on a dedicated processing chip included as part of the hardware of a plurality of devices.

FIG. 6 is a diagram showing an embodiment 600 in which a standardized version of a chunklet library 603 and associated algorithms 604 would be encoded as firmware 602 on a dedicated processing chip 601 included as part of the hardware of a plurality of devices 600. Contained on dedicated chip 601 would be a firmware area 602, on which would be stored a copy of a standardized chunklet library 603 and deconstruction/reconstruction algorithms 604 for processing the data. Processor 605 would have both inputs 606 and outputs 607 to other hardware on the device 600. Processor 605 would store incoming data for processing on on-chip memory 608, process the data using standardized chunklet library 603 and deconstruction/reconstruction algorithms 604, and send the processed data to other hardware on device 600. Using this embodiment, the encoding and decoding of data would be handled by dedicated chip 601, keeping the burden of data processing off device's 600 primary processors. Any device equipped with this embodiment would be able to store and transmit data in a highly optimized, bandwidth-efficient format with any other device equipped with this embodiment.

Figure 12:
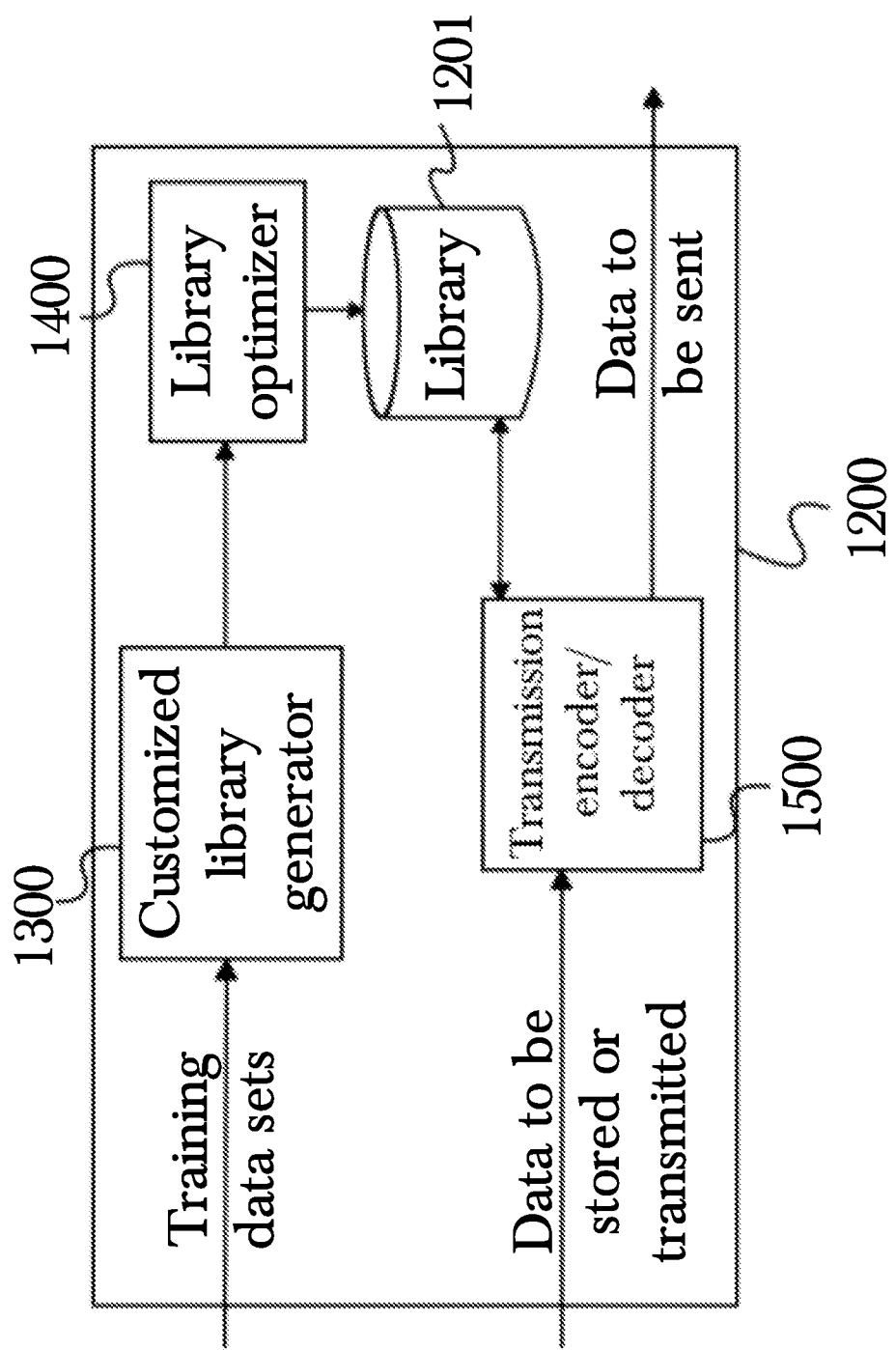
FIG. 12 is a diagram showing an exemplary system architecture, according to a preferred embodiment of the invention.

FIG. 12 is a diagram showing an exemplary system architecture 1200, according to a preferred embodiment of the invention. Incoming training data sets may be received at a customized library generator 1300 that processes training data to produce a customized word library 1201 comprising key-value pairs of data words (each comprising a string of bits) and their corresponding calculated binary Huffman codewords. The resultant word library 1201 may then be processed by a library optimizer 1400 to reduce size and improve efficiency, for example by pruning low-occurrence data entries or calculating approximate codewords that may be used to match more than one data word. A transmission encoder/decoder 1500 may be used to receive incoming data intended for storage or transmission, process the data using a word library 1201 to retrieve codewords for the words in the incoming data, and then append the codewords (rather than the original data) to an outbound data stream. Each of these components is described in greater detail below, illustrating the particulars of their respective processing and other functions, referring to FIGS. 2-4.

System 1200 provides near-instantaneous source coding that is dictionary-based and learned in advance from sample training data, so that encoding and decoding may happen concurrently with data transmission. This results in computational latency that is near zero but the data size reduction is comparable to classical compression. For example, if N bits are to be transmitted from sender to receiver, the compression ratio of classical compression is C the ratio between the deflation factor of system 1200 and that of multi-pass source coding is p, the classical compression encoding rate is $R_C$ bit/s and the decoding rate is $R_D$ bit/s, and the transmission speed is S bit/s, the compress-send-decompress time will be $$T_{old} = \frac{N}{R_C} + \frac{N}{CS} + \frac{N}{CR_D}$$

while the transmit-while-coding time for system 1200 will be (assuming that encoding and decoding happen at least as quickly as network latency):

$$T_{new} = \frac{N_p}{CS}$$

so that the total data transit time improvement factor is $$\frac{T_{old}}{T_{new}} = \frac{\frac{CS}{R_C} + 1 + \frac{S}{R_D}}{p}$$

which presents a savings whenever $$\frac{CS}{R_C} + \frac{S}{R_D} > p - 1.$$

This is a reasonable scenario given that typical values in real-world practice are C=0.32, $R_C$=1.1·10$^{12}$, $R_D$=4.2·10$^{11}$, giving $$\frac{CS}{R_C} + \frac{S}{R_D} = 0.053 \ldots,$$

such that system 1200 will outperform the total transit time of the best compression technology available as long as its deflation factor is no more than 5% worse than compression. Such customized dictionary-based encoding will also sometimes exceed the deflation ratio of classical compression, particularly when network speeds increase beyond 100 Gb/s.

The delay between data creation and its readiness for use at a receiving end will be equal to only the source word length t (typically 5-15 bytes), divided by the deflation factor C/p and the network speed S, i.e.

$$delay_{invention} = \frac{tp}{cs}$$

since encoding and decoding occur concurrently with data transmission. On the other hand, the latency associated with classical compression is $$delay_{priorart} = \frac{N}{R_C} + \frac{N}{CS} + \frac{N}{CR_D}$$

where N is the packet/file size. Even with the generous values chosen above as well as N=512K, t=10, and p=1.05, this results in $delay_{invention} \approx 3.3 \cdot 10^{-10}$ while $delay_{priorart} \approx 1.3 \cdot 10^{-7}$, a more than 400-fold reduction in latency.

A key factor in the efficiency of Huffman coding used by system 1200 is that key-value pairs be chosen carefully to minimize expected coding length, so that the average deflation/compression ratio is minimized. It is possible to achieve the best possible expected code length among all instantaneous codes using Huffman codes if one has access to the exact probability distribution of source words of a given desired length from the random variable generating them. In practice this is impossible, as data is received in a wide variety of formats and the random processes underlying the source data are a mixture of human input, unpredictable (though in principle, deterministic) physical events, and noise. System 1200 addresses this by restriction of data types and density estimation; training data is provided that is representative of the type of data anticipated in "real-world" use of system 1200, which is then used to model the distribution of binary strings in the data in order to build a Huffman code word library 1200.

Figure 13:
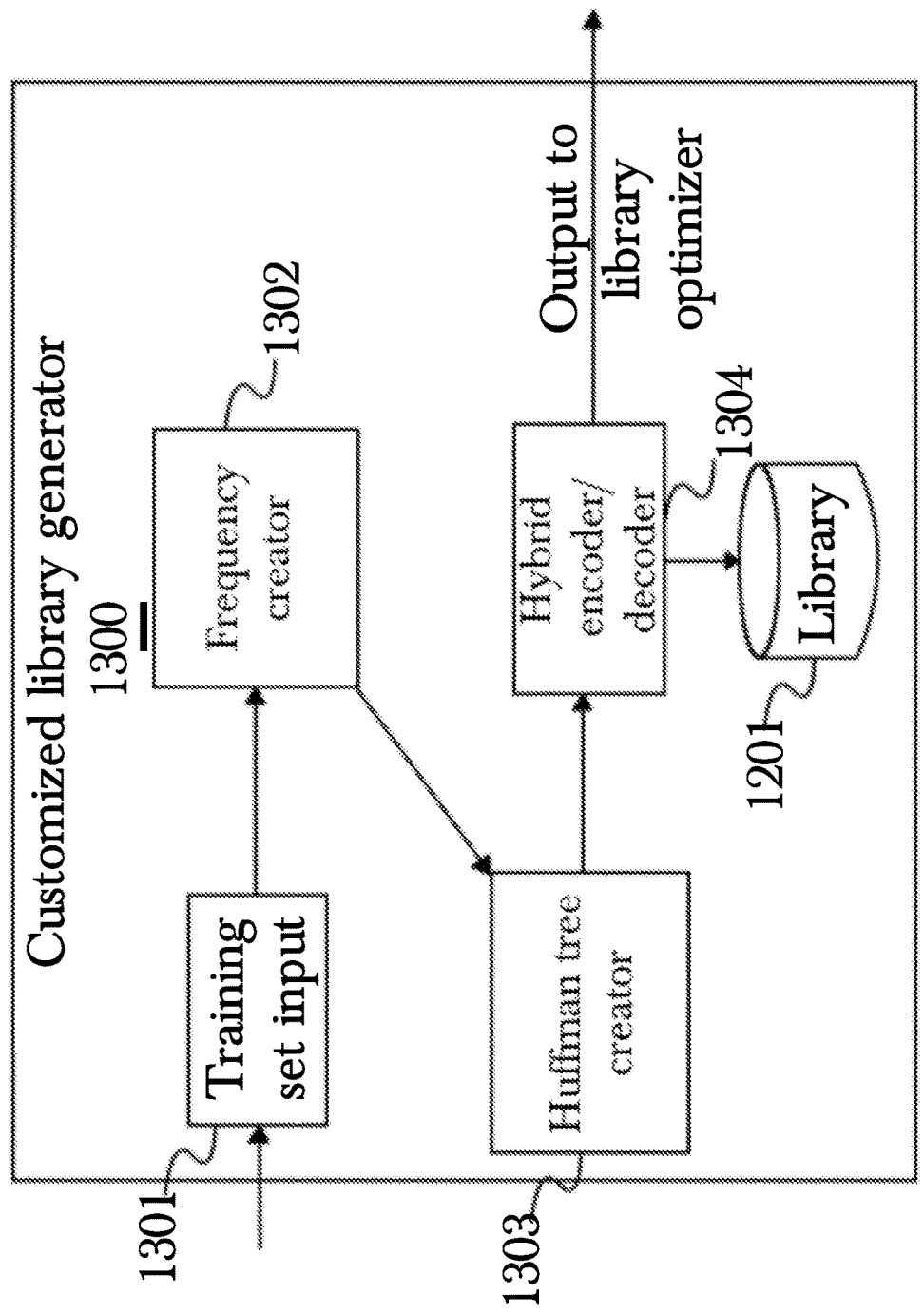
FIG. 13 is a diagram showing a more detailed architecture for a customized library generator.

FIG. 13 is a diagram showing a more detailed architecture for a customized library generator 1300. When an incoming training data set 1301 is received, it may be analyzed using a frequency creator 1302 to analyze for word frequency (that is, the frequency with which a given word occurs in the training data set). Word frequency may be analyzed by scanning all substrings of bits and directly calculating the frequency of each substring by iterating over the data set to produce an occurrence frequency, which may then be used to estimate the rate of word occurrence in non-training data. A first Huffman binary tree is created based on the frequency of occurrences of each word in the first dataset, and a Huffman codeword is assigned to each observed word in the first dataset according to the first Huffman binary tree. Machine learning may be utilized to improve results by processing a number of training data sets and using the results of each training set to refine the frequency estimations for non-training data, so that the estimation yield better results when used with real-world data (rather than, for example, being only based on a single training data set that may not be very similar to a received non-training data set). A second Huffman tree creator 1303 may be utilized to identify words that do not match any existing entries in a word library 1201 and pass them to a hybrid encoder/decoder 1304, that then calculates a binary Huffman codeword for the mismatched word and adds the codeword and original data to the word library 1201 as a new key-value pair. In this manner, customized library generator 1300 may be used both to establish an initial word library 1201 from a first training set, as well as expand the word library 1201 using additional training data to improve operation.

Figure 14:
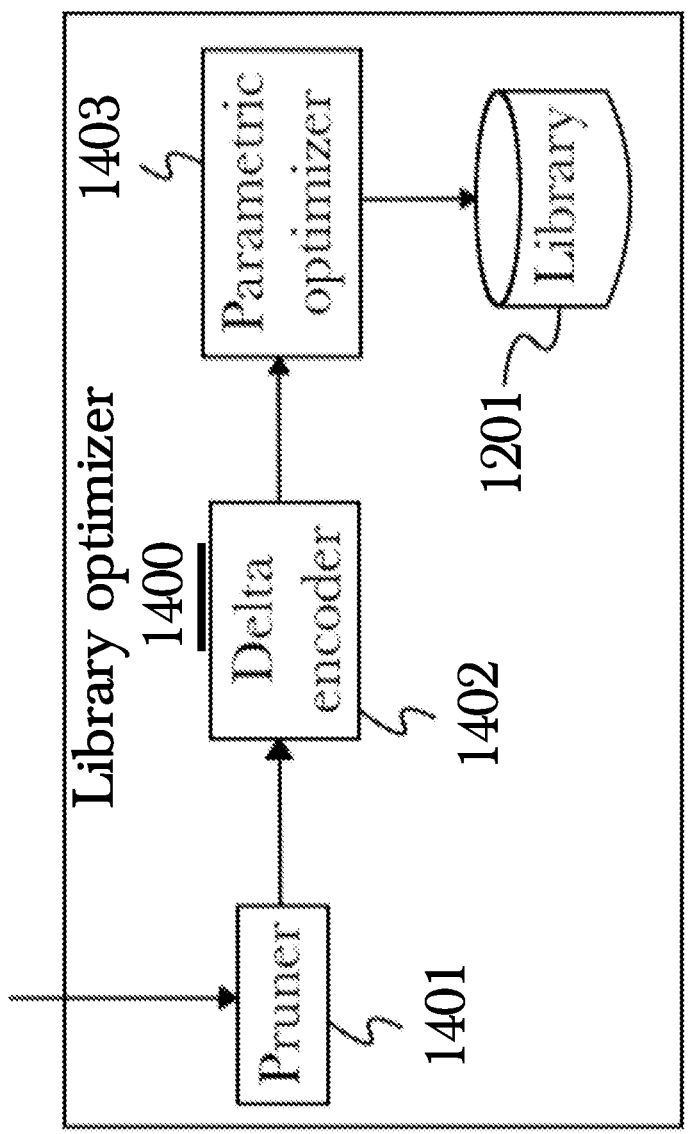
FIG. 14 is a diagram showing a more detailed architecture for a library optimizer.

FIG. 14 is a diagram showing a more detailed architecture for a library optimizer 1400. A pruner 1401 may be used to load a word library 1201 and reduce its size for efficient operation, for example by sorting the word library 1201 based on the known occurrence probability of each key-value pair and removing low-probability key-value pairs based on a loaded threshold parameter. This prunes low-value data from the word library to trim the size, eliminating large quantities of very-low-frequency key-value pairs such as single-occurrence words that are unlikely to be encountered again in a data set. Pruning eliminates the least-probable entries from word library 1201 up to a given threshold, which will have a negligible impact on the deflation factor since the removed entries are only the least-common ones, while the impact on word library size will be larger because samples drawn from asymptotically normal distributions (such as the log-probabilities of words generated by a probabilistic finite state machine, a model well-suited to a wide variety of real-world data) which occur in tails of the distribution are disproportionately large in counting measure. A delta encoder 1402 may be utilized to apply delta encoding to a plurality of words to store an approximate codeword as a value in the word library, for which each of the plurality of source words is a valid corresponding key. This may be used to reduce library size by replacing numerous key-value pairs with a single entry for the approximate codeword and then represent actual codewords using the approximate codeword plus a delta value representing the difference between the approximate codeword and the actual codeword. Approximate coding is optimized for low-weight sources such as Golomb coding, run-length coding, and similar techniques. The approximate source words may be chosen by locality-sensitive hashing, so as to approximate Hamming distance without incurring the intractability of nearest-neighbor-search in Hamming space. A parametric optimizer 1403 may load configuration parameters for operation to optimize the use of the word library 1201 during operation. Best-practice parameter/hyperparameter optimization strategies such as stochastic gradient descent, quasi-random grid search, and evolutionary search may be used to make optimal choices for all interdependent settings playing a role in the functionality of system 1200. In cases where lossless compression is not required, the delta value may be discarded at the expense of introducing some limited errors into any decoded (reconstructed) data.

Figure 15:
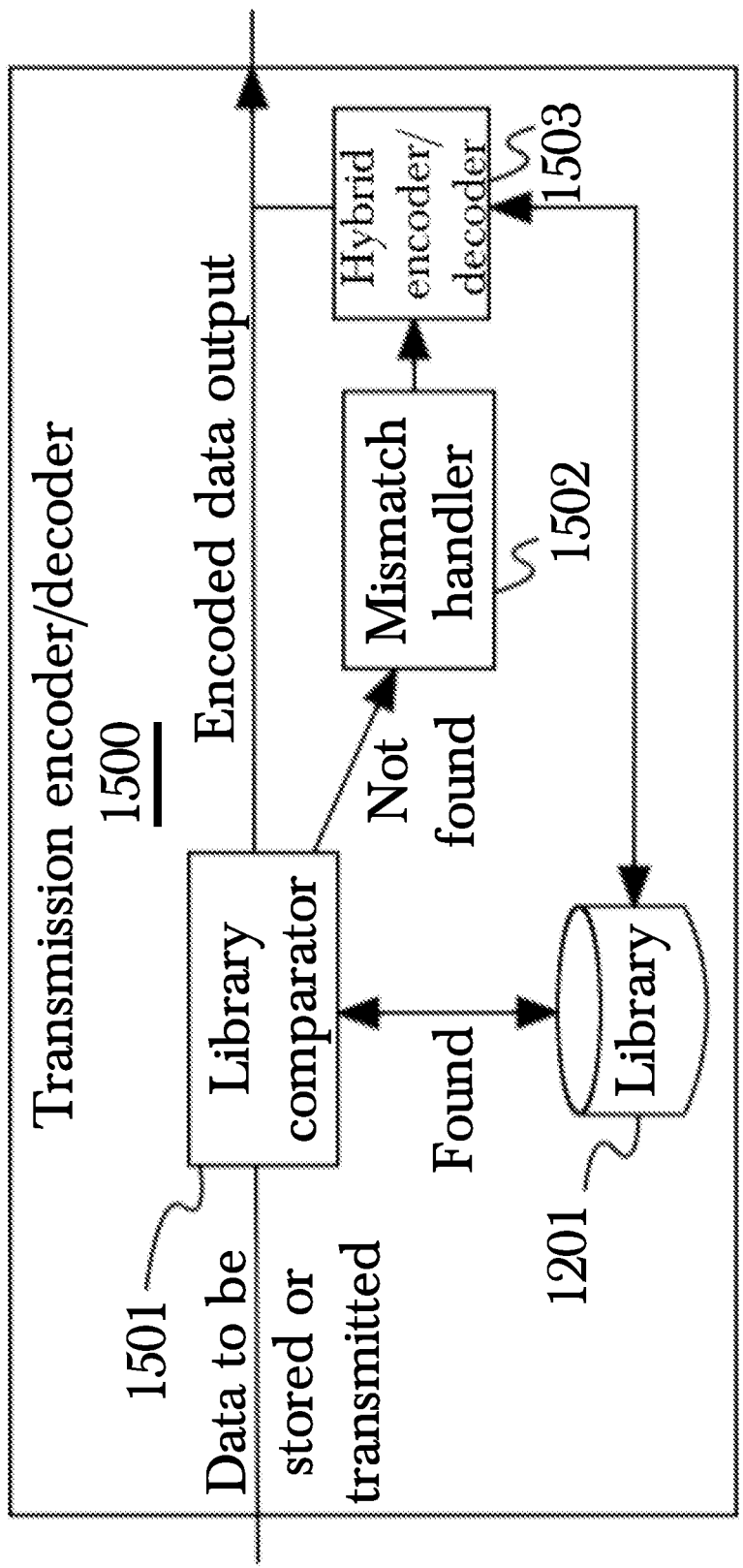
FIG. 15 is a diagram showing a more detailed architecture for a transmission and storage engine.

FIG. 15 is a diagram showing a more detailed architecture for a transmission encoder/decoder 1500. According to various arrangements, transmission encoder/decoder 1500 may be used to deconstruct data for storage or transmission, or to reconstruct data that has been received, using a word library 1201. A library comparator 1501 may be used to receive data comprising words or codewords, and compare against a word library 1201 by dividing the incoming stream into substrings of length t and using a fast hash to check word library 1201 for each substring. If a substring is found in word library 1201, the corresponding key/value (that is, the corresponding source word or codeword, according to whether the substring used in comparison was itself a word or codeword) is returned and appended to an output stream. If a given substring is not found in word library 1201, a mismatch handler 1502 and hybrid encoder/decoder 1503 may be used to handle the mismatch similarly to operation during the construction or expansion of word library 1201. A mismatch handler 1502 may be utilized to identify words that do not match any existing entries in a word library 1201 and pass them to a hybrid encoder/decoder 1503, that then calculates a binary Huffman codeword for the mismatched word and adds the codeword and original data to the word library 1201 as a new key-value pair. The newly-produced codeword may then be appended to the output stream. In arrangements where a mismatch indicator is included in a received data stream, this may be used to preemptively identify a substring that is not in word library 1201 (for example, if it was identified as a mismatch on the transmission end), and handled accordingly without the need for a library lookup.

Figure 19:
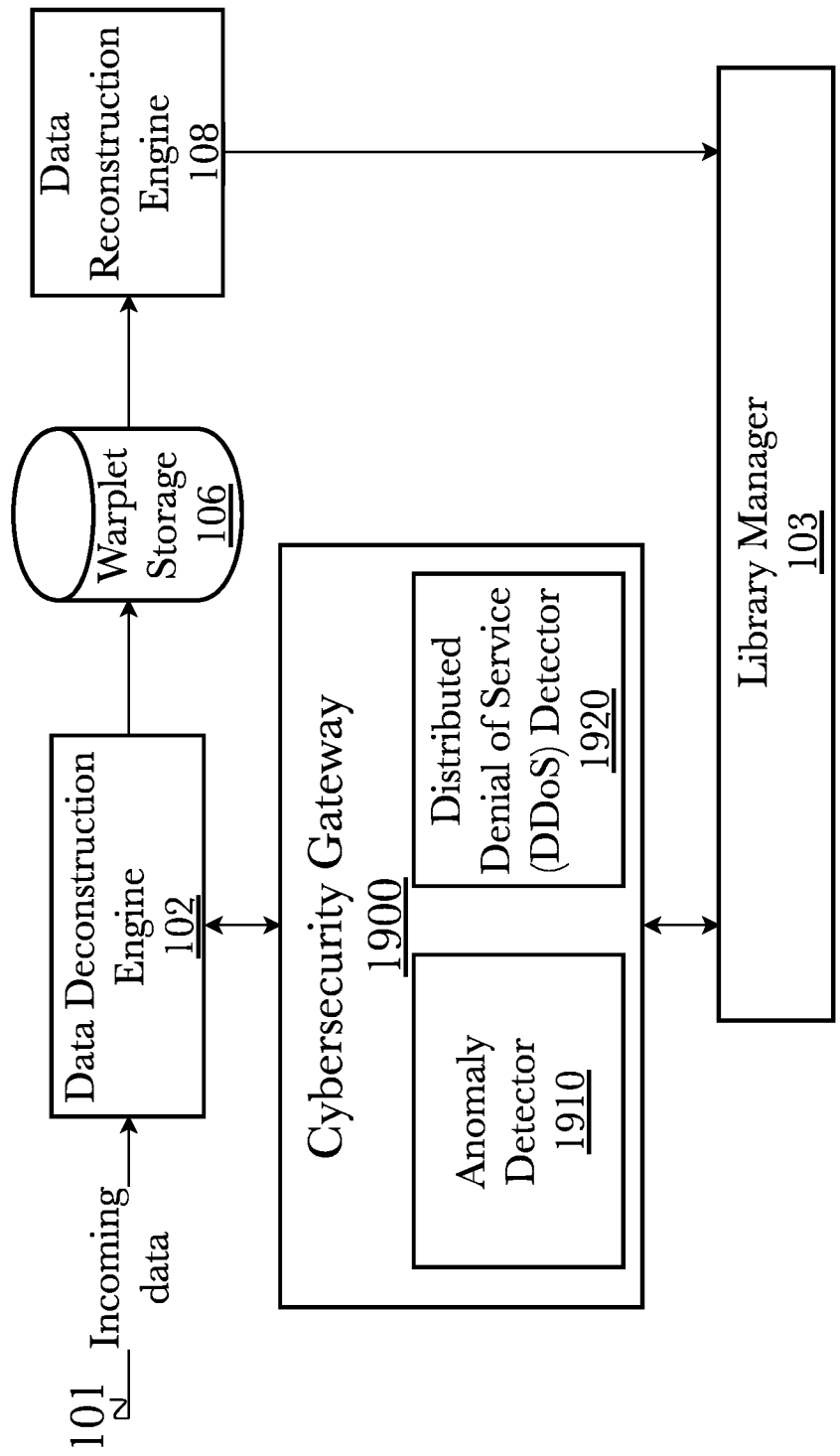
FIG. 19 is an exemplary system architecture of a data encoding system used for cyber security purposes.

FIG. 19 is an exemplary system architecture of a data encoding system used for cyber security purposes. Much like in FIG. 1, incoming data 101 to be deconstructed is sent to a data deconstruction engine 102, which may attempt to deconstruct the data and turn it into a collection of warplets using a library manager 103. Warplet storage 106 serves to store unique warplets from this process and may be queried by a data reconstruction engine 108 which may reconstruct the original data from the warplets, using a library manager 103. However, a cybersecurity gateway 1900 is present, communicating in-between a library manager 103 and a deconstruction engine 102, and containing an anomaly detector 1910 and distributed denial of service (DDoS) detector 1920. The anomaly detector examines incoming data to determine whether there is a disproportionate number of incoming reference codes that do not match reference codes in the existing library. A disproportionate number of non-matching reference codes may indicate that data is being received from an unknown source, of an unknown type, or contains unexpected (possibly malicious) data. If the disproportionate number of non-matching reference codes exceeds an established threshold or persists for a certain length of time, the anomaly detector 1910 raises a warning to a system administrator. Likewise, the DDoS detector 1920 examines incoming data to determine whether there is a disproportionate amount of repetitive data. A disproportionate amount of repetitive data may indicate that a DDoS attack is in progress. If the disproportionate amount of repetitive data exceeds an established threshold or persists for a certain length of time, the DDoS detector 1910 raises a warning to a system administrator. In this way, a data encoding system may detect and warn users of, or help mitigate, common cyber-attacks that result from a flow of unexpected and potentially harmful data, or attacks that result from a flow of too much irrelevant data meant to slow down a network or system, as in the case of a DDoS attack.

Figure 22:
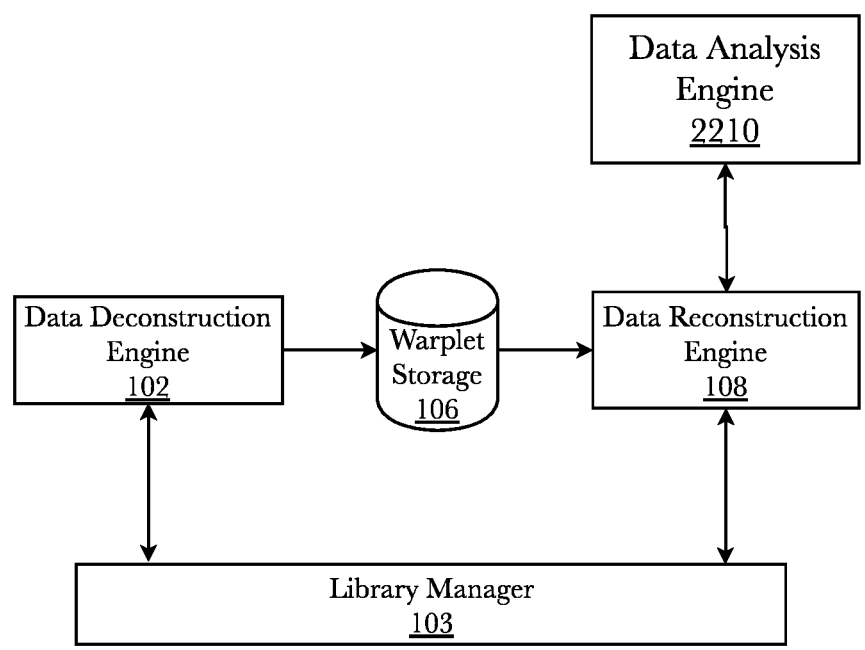
FIG. 22 is an exemplary system architecture of a data encoding system used for data mining and analysis purposes.

FIG. 22 is an exemplary system architecture of a data encoding system used for data mining and analysis purposes. Much like in FIG. 1, incoming data 101 to be deconstructed is sent to a data deconstruction engine 102, which may attempt to deconstruct the data and turn it into a collection of warplets using a library manager 103. Warplet storage 106 serves to store unique warplets from this process and may be queried by a data reconstruction engine 108 which may reconstruct the original data from the warplets, using a library manager 103. A data analysis engine 2210, typically operating while the system is otherwise idle, sends requests for data to the data reconstruction engine 108, which retrieves the warplets representing the requested data from warplet storage 106, reconstructs them into the data represented by the warplets, and send the reconstructed data to the data analysis engine 2210 for analysis and extraction of useful data (i.e., data mining). Because the speed of reconstruction is significantly faster than decompression using traditional compression technologies (i.e., significantly less decompression latency), this approach makes data mining feasible. Very often, data stored using traditional compression is not mined precisely because decompression lag makes it unfeasible, especially during shorter periods of system idleness. Increasing the speed of data reconstruction broadens the circumstances under which data mining of stored data is feasible.

Figure 24:
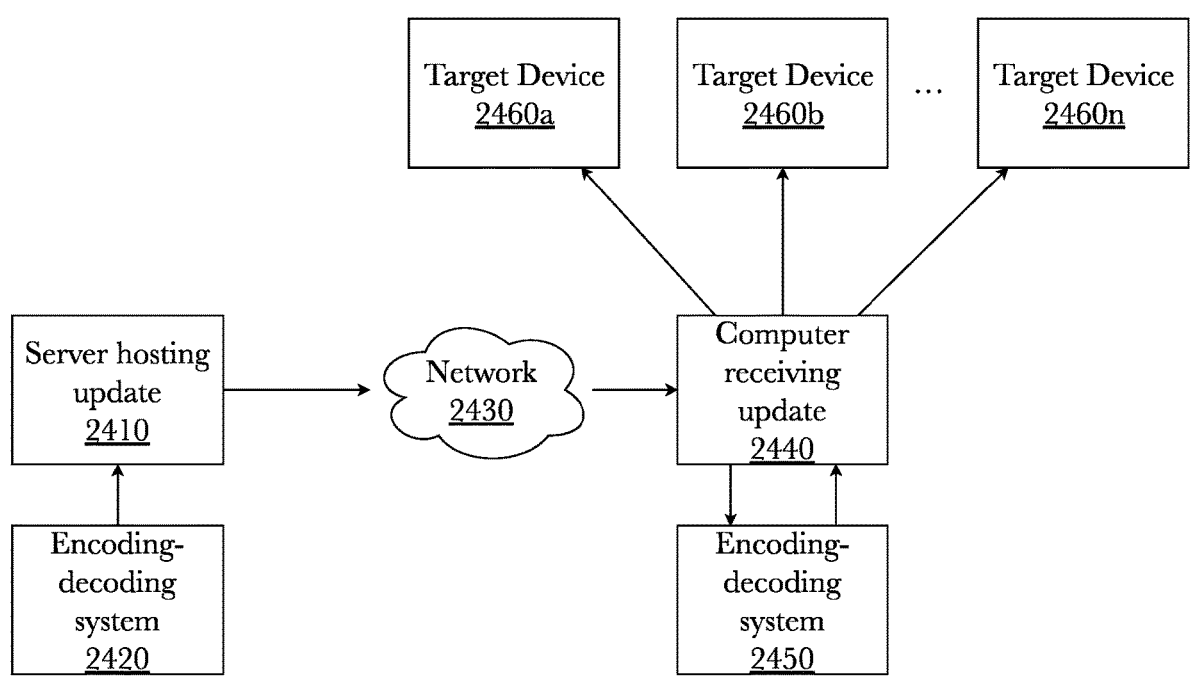
FIG. 24 is an exemplary system architecture of a data encoding system used for remote software and firmware updates.

FIG. 24 is an exemplary system architecture of a data encoding system used for remote software and firmware updates. Software and firmware updates typically require smaller, but more frequent, file transfers. A server which hosts a software or firmware update 2410 may host an encoding-decoding system 2420, allowing for data to be encoded into, and decoded from, chunklets or warplets, as disclosed in previous figures. Such a server may possess a software update, operating system update, firmware update, device driver update, or any other form of software update, which in some cases may be minor changes to a file, but nevertheless necessitate sending the new, completed file to the recipient. Such a server is connected over a network 2430, which is further connected to a recipient computer 2440, which may be connected to a server 2410 for receiving such an update to its system. In this instance, the recipient device 2440 also hosts the encoding and decoding system 2450, along with a codebook or library of reference codes that the hosting server 2410 also shares. The updates are retrieved from storage at the hosting server 2410 in the form of warplets, transferred over the network 2430 in the form of warplets, and reconstructed on the receiving computer 2440. In this way, a far smaller file size, and smaller total update size, may be sent over a network. The receiving computer 2440 may then install the updates on any number of target computing devices 2460a-n, using a local network or other high-bandwidth connection.

Figure 26:
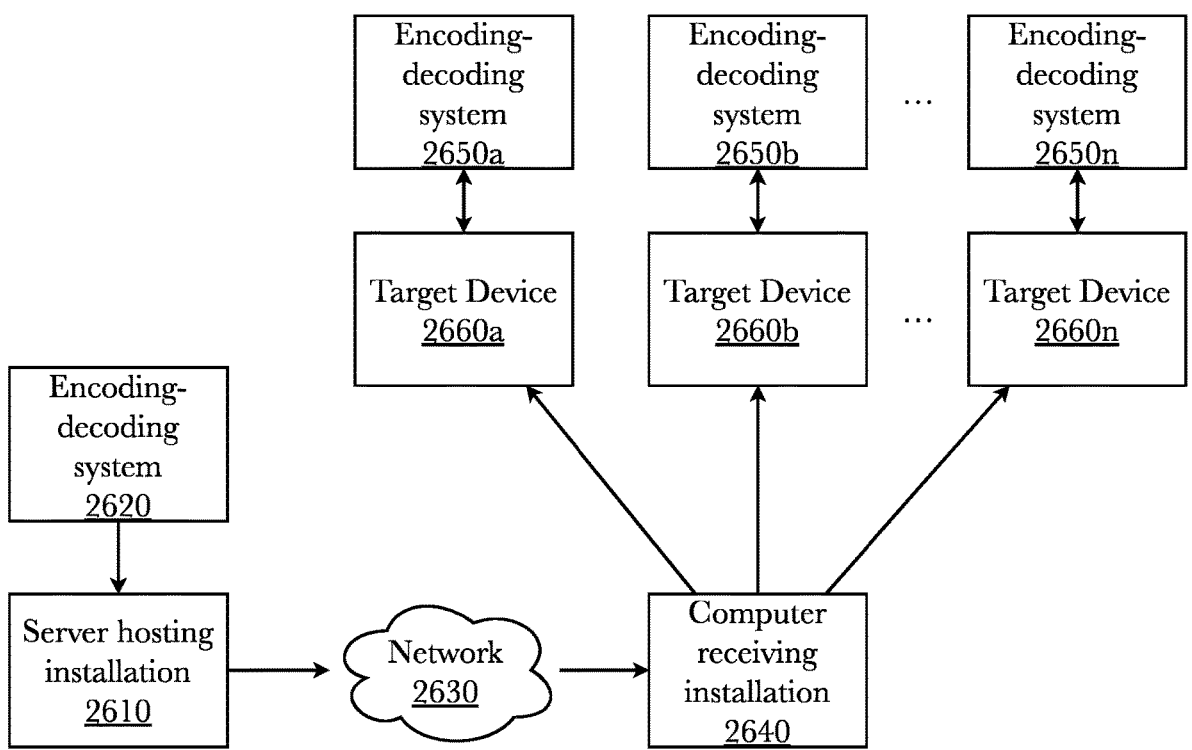
FIG. 26 is an exemplary system architecture of a data encoding system used for large-scale software installation such as operating systems.

FIG. 26 is an exemplary system architecture of a data encoding system used for large-scale software installation such as operating systems. Large-scale software installations typically require very large, but infrequent, file transfers. A server which hosts an installable software 2610 may host an encoding-decoding system 2620, allowing for data to be encoded into, and decoded from, chunklets or warplets, as disclosed in previous figures. The files for the large scale software installation are hosted on the server 2610, which is connected over a network 2630 to a recipient computer 2640. In this instance, the encoding and decoding system 2650a-n is stored on or connected to one or more target devices 2660a-n, along with a codebook or library of reference codes that the hosting server 2610 shares. The software is retrieved from storage at the hosting server 2610 in the form of warplets, and transferred over the network 2630 in the form of warplets to the receiving computer 2640. However, instead of being reconstructed at the receiving computer 2640, the warplets are transmitted to one or more target computing devices, and reconstructed and installed directly on the target devices 2660a-n. In this way, a far smaller file size, and smaller total update size, may be sent over a network or transferred between computing devices, even where the network 2630 between the receiving computer 2640 and target devices 2660a-n is low bandwidth, or where there are many target devices 2660a-n.

Figure 28:
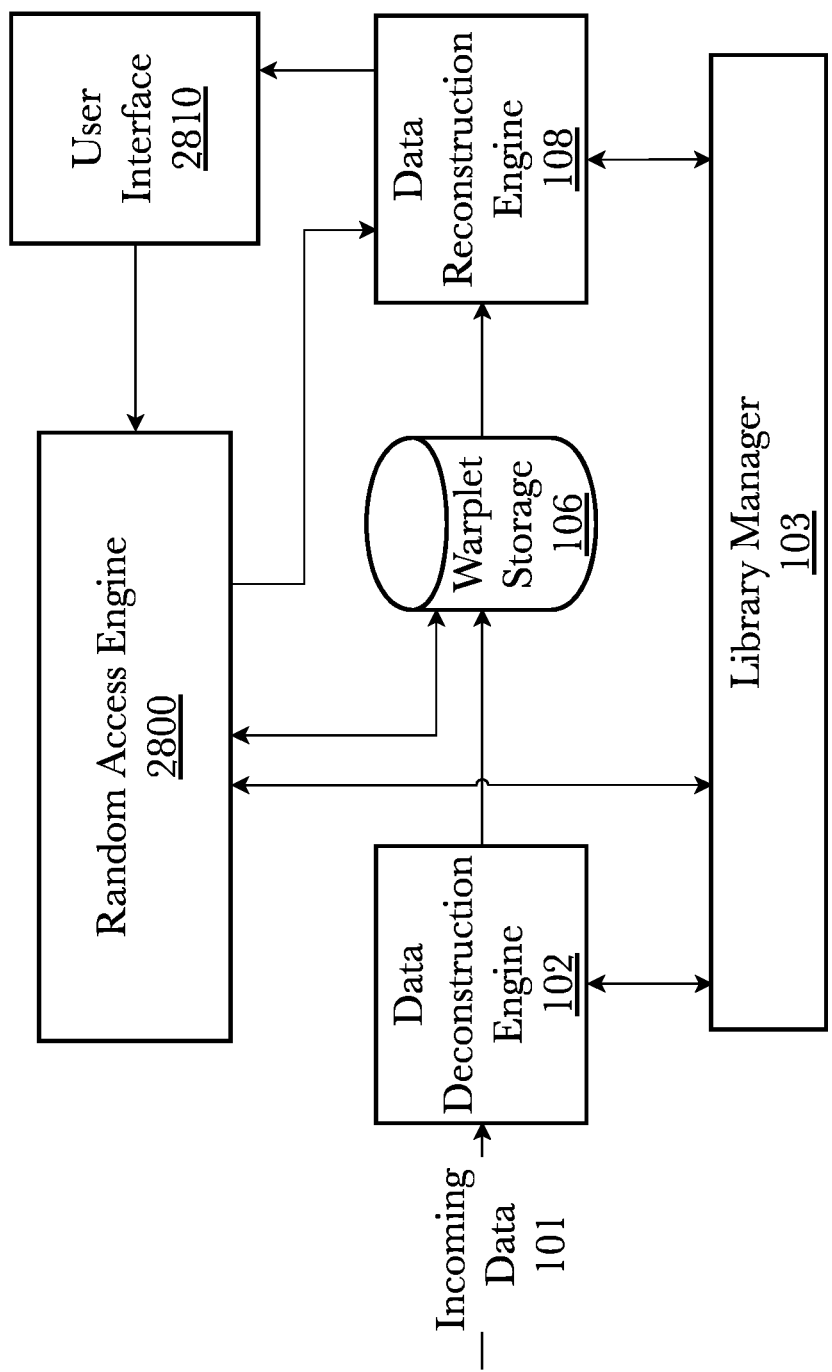
FIG. 28 is an exemplary system architecture of a data encoding system with random access capabilities.

FIG. 28 is an exemplary system architecture of a data encoding system with random access capabilities. Much like in FIG. 1, incoming data 101 to be deconstructed is sent to a data deconstruction engine 102, which may attempt to deconstruct the data and turn it into a collection of warplets using a library manager 103. Warplet storage 106 serves to store unique warplets from this process, and may be queried by a data reconstruction engine 108 which may reconstruct the original data from the warplets, using a library manager 103. However, a random-access engine 2800 exists that receives a data query request from a user interface 2810 such as a graphical user interface. The query request may comprise identification of a compacted data file to search and a search term, and optionally a location hint. Various possible search term configurations may exist such as a byte range (i.e. begin at byte N and return M number of bytes), a string such as "volleyball" or a date such as "11/06/2020", among others. The random access engine 2800 may also query the library manager 103 for retrieval of the reference codebook corresponding to the identified compacted data file. Additionally, the random access engine 2800 may query the warplet storage 106 for retrieval of a plurality of warplets, the plurality of warplets representing the compacted data file to be searched and read from. When the search term has been found, it may be sent to the data reconstruction engine 108 where it may be decoded to recover the original data, and the original data may be sent to the user interface 2810. The user may verify the search result is correct. If the result is incorrect the user may refine and submit a new search request.

Figure 29:
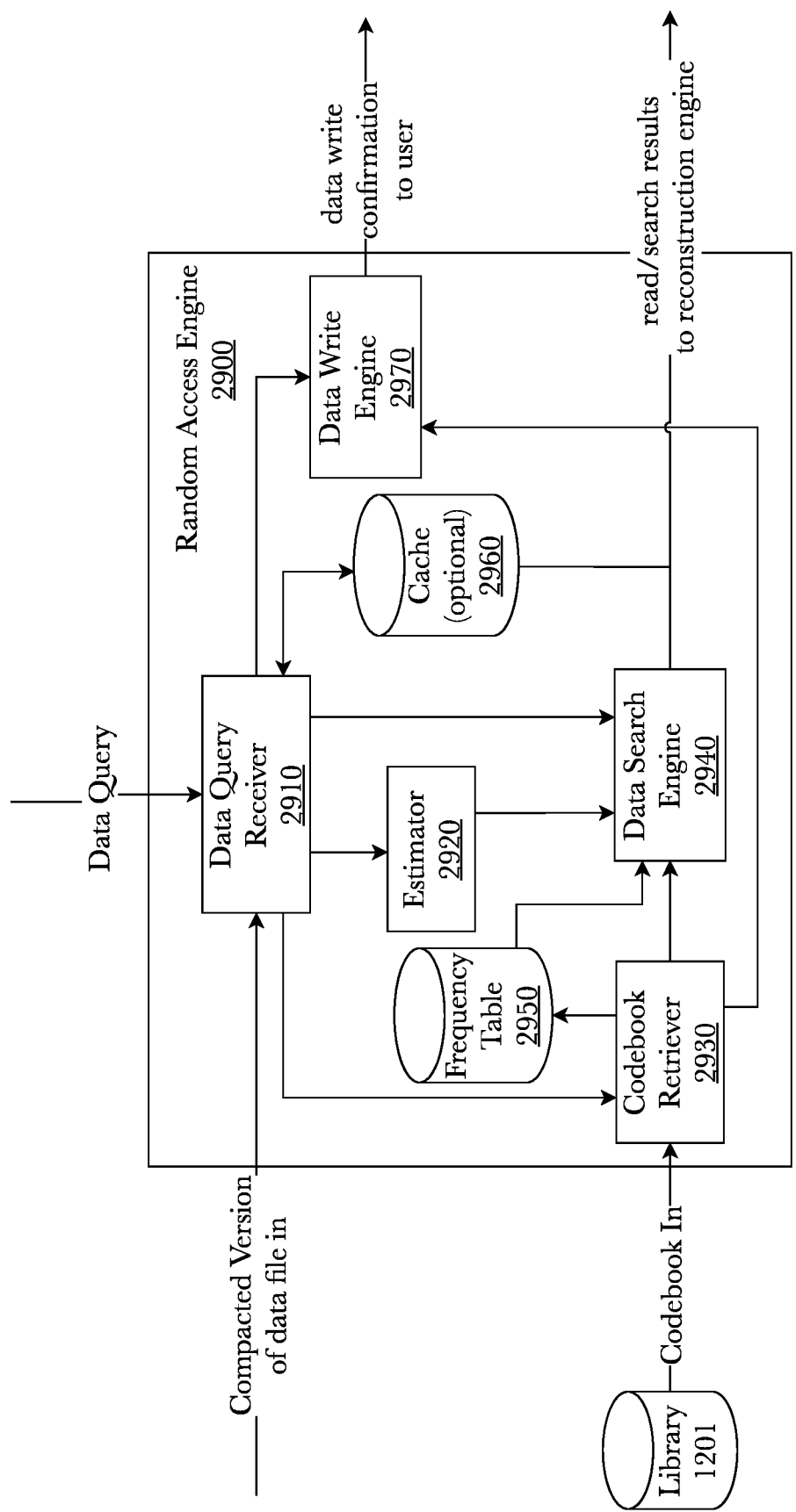
FIG. 29 is a diagram showing an embodiment of one aspect of the system, the random access engine.

FIG. 29 is a diagram showing an embodiment of one aspect of the system, the random access engine 2900. The process begins when a data query request is made to the application. A data read query may comprise identification of a compacted data file to access, a search term, and optionally a location hint serving as an initial guess as to the location of the search term within the original data file. As a simple example of a data read query, the user searches for the string "cosmology" in a compacted data file "Y" to read from, and a location hint of byte "N" to be used to estimate where in "Y" the string "cosmology" may occur. Additionally, the random access engine 2900 may receive a data write query which may include the write term to be written and an identified compacted data file in which to write the write term. A data query receiver 2910 parses both data read and data write queries and retrieves the identified compacted data file in the form of a plurality of warplets from warplet storage 106. The data query receiver 2910 then sends the retrieved compacted data file and the search term to the data search engine 2940. If the data search query includes a location hint, then the query receiver 2910 may send the location hint to an estimator 2920. A location hint may be given that represents where in the original file the data to be read may be located, and the estimator receives the location hint and estimates that same location in the compacted version of the data file. A location hint may comprise a byte location N in the original file X, the estimator 2920 estimates the location (bit number) N' in Y (compacted version of data file) corresponding to byte N in X. The estimator 2920 may check if the estimated location N' is located at a codeword boundary or in the middle of a codeword. If N' lies within a codeword, then the estimator may use bit-scrolling backward and forward to find the codeword boundary. Additionally, the location hint may comprise a user command such as "start at the 45% mark". The estimator 2920 sends the estimated location of the byte range to the data search engine 2940 for further processing.

A codebook retriever 2930 receives a signal form the data query receiver 2910 that prompts the codebook retriever 2930 to request the codebook and frequency table associated with the compacted data file from a word library 1201. The frequency table 2950 shows the most frequently occurring words or substrings within a data set and may be used by the data search engine 2940 to refine the location estimate.

The data search engine 2940 receives a data read request in the form of a search term such as a byte range, string, or substring, and may receive an initial location estimate from the estimator 2920 if a location hint was included in the data read query. The data search engine 2940 may use a frequency table 2950 to refine location estimates and identify codeword boundaries in an automatic way. The estimated location may be in the middle of a codeword. If this is the case, then the search results will return output that does not match the search query. For example, the search results return a sequence of bytes, the frequency table 2950 may be used to identify whether the sequence of bytes are unlikely to occur in the original data, or if the sequence was reasonably likely then a codeword boundary has probably been found. When a codeword boundary is found, it allows the whole compacted data file to be accessed in any order by jumping from codeword to codeword, facilitating useful search results. If the data request is in a string format and a location hint was provided, then the data search engine 2940 may automatically locate the search string via a binary search from the estimated starting point or a found codeword boundary. The data search engine 2940 may also parse a search term string into chunklets and create at least one or more encodings for sub-search strings derived from the original search string. An exemplary parsing process is discussed in more detail in FIG. 33 contained within this disclosure. Additionally, various search operators may be integrated into the search capabilities. A few examples of search operators include "near", "and", "or", and "not". These may be used to narrow the scope of the search. Once the byte range or search string has been located, the codebook may be used to decode the located reference codes belonging to the search string or byte range. In other embodiments, the located reference codes may be sent to the data reconstruction engine 108 which sends the decoded byte range or search string to the user for verification.

A search cache 2960 may optionally be used to store previous search terms and their locations within the compacted data file. The data query receiver 2910 may look for the requested data in the cache 2960 and if it is found in the cache then its location is sent to the data reconstruction engine 108 where the compacted data may be reconstructed and then sent to the user for review.

If the data query is a data write query, then the data query receiver 2910 may send a signal to the codebook retriever 2930 to retrieve the codebook corresponding to the identified compacted version of the data file in which the write term is to be written and send the write term to a data write engine 2970. The codebook retriever 2930 sends the codebook to the data write engine 2970. If the size of the data to be written (write term) is exactly the length of the sourceblock (chunklet), then the data write engine 2970 can simply encode the data and insert it into the received codebook. More likely, the size of the data to be written does not exactly match the sourceblock length, and simply encoding and adding the codeword to the codebook would modify the output of the codewords globally, basically changing everything from that point on. In an embodiment, when some data is to be inserted into the original data file, the original file may be entirely re-encoded. In another embodiment, instead of re-encoding the entire file, an opcode is created that tells the decoder there is an offset that has to be accounted for when reconstructing the compacted data. In yet another embodiment, instead of using an opcode, there are extra unused bits available in the codebook that can be used to encode information about how many secondary bytes are coming up. A secondary byte(s) represent the newly written data that may be encoded and inserted in the codebook. In this way when encoded bit is found, the data encoder can switch to secondary encoding, encode one fewer byte, then resume normal encoding. This allows for inserting data into the original data file without having to re-encode the entire file.

Figure 34:
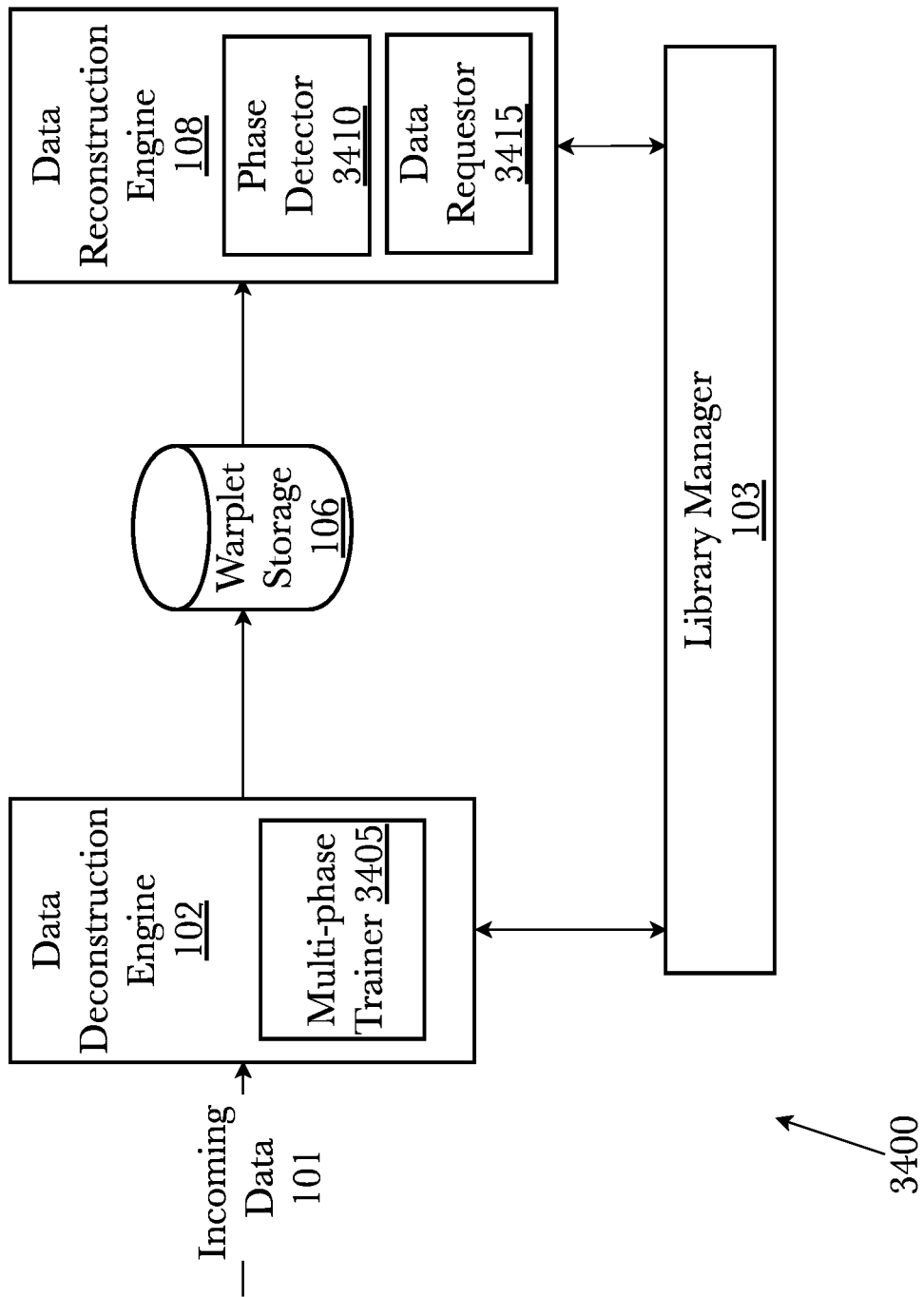
FIG. 34 is a block diagram illustrating an exemplary system architecture for an error-resilient data reduction, according to an embodiment.

FIG. 34 is a block diagram illustrating an exemplary system architecture 3400 for error-resilient data reduction, according to an embodiment. Much like in FIG. 1, incoming data 101 to be deconstructed is sent to a data deconstruction engine 102, which may attempt to deconstruct the data and turn it into a collection of warplets using a library manager 103. Warplet storage 106 serves to store unique warplets from this process and may be queried by a data reconstruction engine 108 which may reconstruct the original data from the warplets, using a library manager 103. However, present in data deconstruction engine 102 is a multi-phase trainer 3405 which uses training data to train engines 102 and 108 on sourceblocks at every phase (i.e., phase sizes of 1 bit, 2 bits, 3 bits . . . , etc.). In systems without multi-phase trainer 3405, generally only byte-phase sourceblocks (i.e., starting locations divisible by eight) may be used to train the encoding and decoding engines. Chunklets may be comprised of one or more sourceblocks. In this way, when system 3400 receives a codeword containing an error (e.g., one or more bit-flips, bit deletion or addition, etc.) it is able to return to an "in phase" state in a shorter amount of time compared to systems trained only on byte-phase sourceblocks. In this embodiment, data reconstruction engine 108 further comprises a phase detector 3410 and a data requestor 3415. Phase detector 3410 may automatically detect whether a "phase lock" has been achieved by determining if a predetermined threshold probability for encoding to be correct is exceeded. The threshold probability may be estimated by referring to the data model constructed during model training. In some embodiments, the threshold probability may be determined using various statistical algorithms known in the art, for example logistic regression may be used. In this way, system 3400 may be able to detect when sourceblocks get out of phase, and when they return to "in phase", then system 3400 may automatically request retransmission of the blocks that were transmitted while the system was out of phase using a data requestor 3415. This may be done at the end of a data file's (stream) transmission and the slightly-corrupted but usable file that is available without delay can be tweaked by replacing the small streams of out-of-phase bits with the correct bits. This corrupted file could be used in the meantime, if needed. For example, an image may be transmitted that is slightly corrupted, but the end user would still be able to view the image with its slight imperfections, and then the image would resolve to full resolution in a short time (after retransmission of small of stream of bits).

DESCRIPTION OF METHOD ASPECTS

Since the library consists of re-usable building chunklets, and the actual data is represented by reference codes to the library, the total storage space of a single set of data would be much smaller than conventional methods, wherein the data is stored in its entirety. The more data sets that are stored, the larger the library becomes, and the more data can be stored in reference code form.

As an analogy, imagine each data set as a collection of printed books that are only occasionally accessed. The amount of physical shelf space required to store many collections would be quite large and is analogous to conventional methods of storing every single bit of data in every data set. Consider, however, storing all common elements within and across books in a single library, and storing the books as references codes to those common elements in that library. As a single book is added to the library, it will contain many repetitions of words and phrases. Instead of storing the whole words and phrases, they are added to a library, and given a reference code, and stored as reference codes. At this scale, some space savings may be achieved, but the reference codes will be on the order of the same size as the words themselves. As more books are added to the library, larger phrases, quotations, and other words patterns will become common among the books. The larger the word patterns, the smaller the reference codes will be in relation to them as not all possible word patterns will be used. As entire collections of books are added to the library, sentences, paragraphs, pages, or even whole books will become repetitive. There may be many duplicates of books within a collection and across multiple collections, many references and quotations from one book to another, and much common phraseology within books on particular subjects. If each unique page of a book is stored only once in a common library and given a reference code, then a book of 1,000 pages or more could be stored on a few printed pages as a string of codes referencing the proper full-sized pages in the common library. The physical space taken up by the books would be dramatically reduced. The more collections that are added, the greater the likelihood that phrases, paragraphs, pages, or entire books will already be in the library, and the more information in each collection of books can be stored in reference form. Accessing entire collections of books is then limited not by physical shelf space, but by the ability to reprint and recycle the books as needed for use.

The projected increase in storage capacity using the method herein described is primarily dependent on two factors: 1) the ratio of the number of bits in a block to the number of bits in the reference code, and 2) the amount of repetition in data being stored by the system.

With respect to the first factor, the number of bits used in the reference codes to the chunklets must be smaller than the number of bits in the chunklets themselves in order for any additional data storage capacity to be obtained. As a simple example, 16-bit chunklets would require $2^{16}$, or 65536, unique reference codes to represent all possible patterns of bits. If all possible 65536 blocks patterns are utilized, then the reference code itself would also need to contain sixteen bits in order to refer to all possible 65,536 blocks patterns. In such case, there would be no storage savings. However, if only 16 of those block patterns are utilized, the reference code can be reduced to 4 bits in size, representing an effective compression of 4 times (16 bits/4 bits=4) versus conventional storage. Using a typical block size of 512 bytes, or 4,096 bits, the number of possible block patterns is $2^{4,096}$, which for all practical purposes is unlimited. A typical hard drive contains one terabyte (TB) of physical storage capacity, which represents 1,953,125,000, or roughly $2^{31}$, 512 byte blocks. Assuming that 1 TB of unique 512-byte chunklets were contained in the library, and that the reference code would thus need to be 31 bits long, the effective compression ratio for stored data would be on the order of 132 times ($4,096/31 \approx 132$) that of conventional storage.

With respect to the second factor, in most cases it could be assumed that there would be sufficient repetition within a data set such that, when the data set is broken down into chunklets, its size within the library would be smaller than the original data. However, it is conceivable that the initial copy of a data set could require somewhat more storage space than the data stored in a conventional manner, if all or nearly all chunklets in that set were unique. For example, assuming that the reference codes are $1/10^{th}$ the size of a full-sized copy, the first copy stored as chunklets in the library would need to be 1.1 megabytes (MB), (1 MB for the complete set of full-sized chunklets in the library and 0.1 MB for the reference codes). However, since the chunklets stored in the library are universal, the more duplicate copies of something you save, the greater efficiency versus conventional storage methods. Conventionally, storing 10 copies of the same data requires 10 times the storage space of a single copy. For example, ten copies of a 1 MB file would take up 10 MB of storage space. However, using the method described herein, only a single full-sized copy is stored, and subsequent copies are stored as reference codes. Each additional copy takes up only a fraction of the space of the full-sized copy. For example, again assuming that the reference codes are $1/10^{th}$ the size of the full-size copy, ten copies of a 1 MB file would take up only 2 MB of space (1 MB for the full-sized copy, and 0.1 MB each for ten sets of reference codes). The larger the library, the more likely that part or all of incoming data will duplicate chunklets already existing in the library.

The size of the library could be reduced in a manner similar to storage of data. Where chunklets differ from each other only by a certain number of bits, instead of storing a new chunklet that is very similar to one already existing in the library, the new chunklet could be represented as a reference code to the existing chunklet, plus information about which bits in the new block differ from the existing block. For example, in the case where 512 byte chunklets are being used, if the system receives a new chunklet that differs by only one bit from a chunklet already existing in the library, instead of storing a new 512 byte chunklet, the new chunklet could be stored as a reference code to the existing chunklet, plus a reference to the bit that differs. Storing the new chunklet as a reference code plus changes would require only a few bytes of physical storage space versus the 512 bytes that a full chunklet would require. The algorithm could be optimized to store new chunklets in this reference code plus changes form unless the changes portion is large enough that it is more efficient to store a new, full chunklet.

It will be understood by one skilled in the art that transfer and synchronization of data would be increased to the same extent as for storage. By transferring or synchronizing reference codes instead of full-sized data, the bandwidth requirements for both types of operations are dramatically reduced.

In addition, the method described herein is inherently a form of encryption. When the data is converted from its full form to reference codes, none of the original data is contained in the reference codes. Without access to the library of chunklets, it would be impossible to reconstruct any portion of the data from the reference codes. This inherent property of the method described herein could obviate the need for traditional encryption algorithms, thereby offsetting most or all of the computational cost of conversion of data back and forth to reference codes. In theory, the method described herein should not utilize any additional computing power beyond traditional storage using encryption algorithms. Alternatively, the method described herein could be in addition to other encryption algorithms to increase data security even further.

In other embodiments, additional security features could be added, such as: creating a proprietary library of chunklets for proprietary networks, physical separation of the reference codes from the library of chunklets, storage of the library of chunklets on a removable device to enable easy physical separation of the library and reference codes from any network, and incorporation of proprietary sequences of how chunklets are read and the data reassembled.

Figure 7:
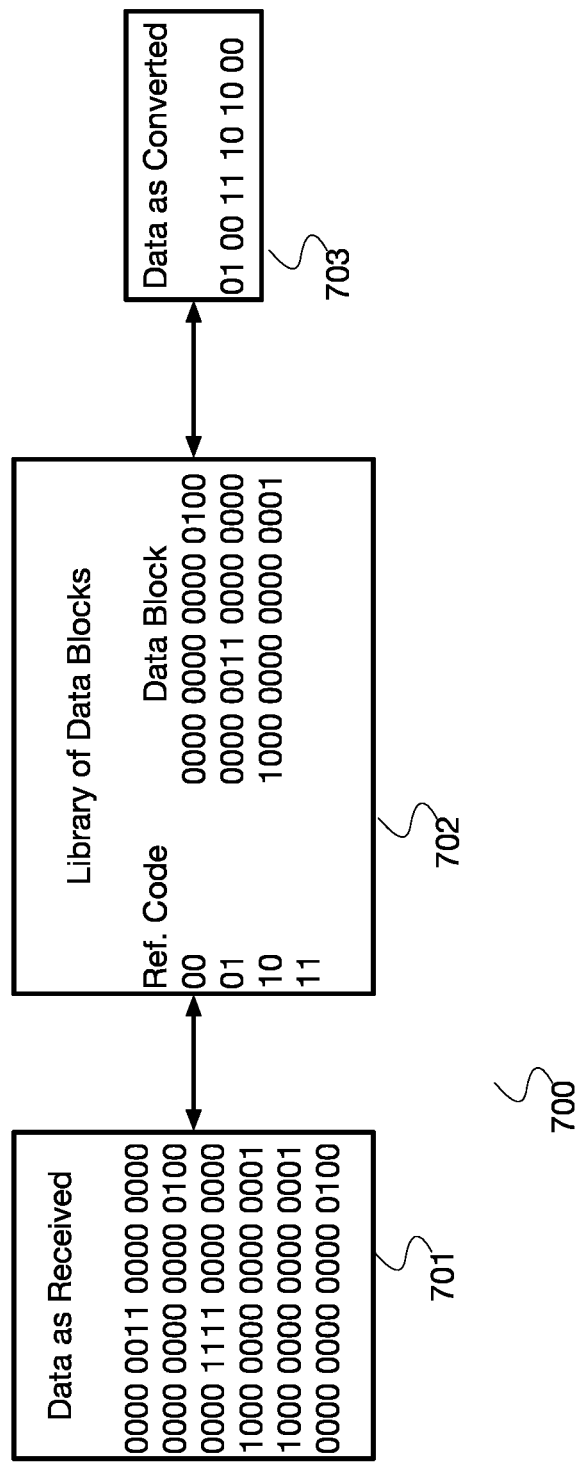
FIG. 7 is a diagram showing an example of how data might be converted into reference codes using an aspect of an embodiment.

FIG. 7 is a diagram showing an example of how data might be converted into reference codes using an aspect of an embodiment 700. As data is received 701, it is read by the processor in chunklets of a size dynamically determined by the previously disclosed chunklet size optimizer 410. In this example, each chunklet is 16 bits in length, and the library 702 initially contains three chunklets with reference codes 00, 01, and 10. The entry for reference code 11 is initially empty. As each 16 bit chunklet is received, it is compared with the library. If that chunklet is already contained in the library, it is assigned the corresponding reference code. So, for example, as the first line of data (0000 0011 0000 0000) is received, it is assigned the reference code (01) associated with that chunklet in the library. If that chunklet is not already contained in the library, as is the case with the third line of data (0000 1111 0000 0000) received in the example, that chunklet is added to the library and assigned a reference code, in this case 11. The data is thus converted 703 to a series of reference codes to chunklets in the library. The data is stored as a collection of warplets, each of which contains the reference code to a chunklet and information about the location of the chunklets in the data set. Reconstructing the data is performed by reversing the process. Each stored reference code in a data collection is compared with the reference codes in the library, the corresponding chunklet is read from the library, and the data is reconstructed into its original form.

Figure 8:
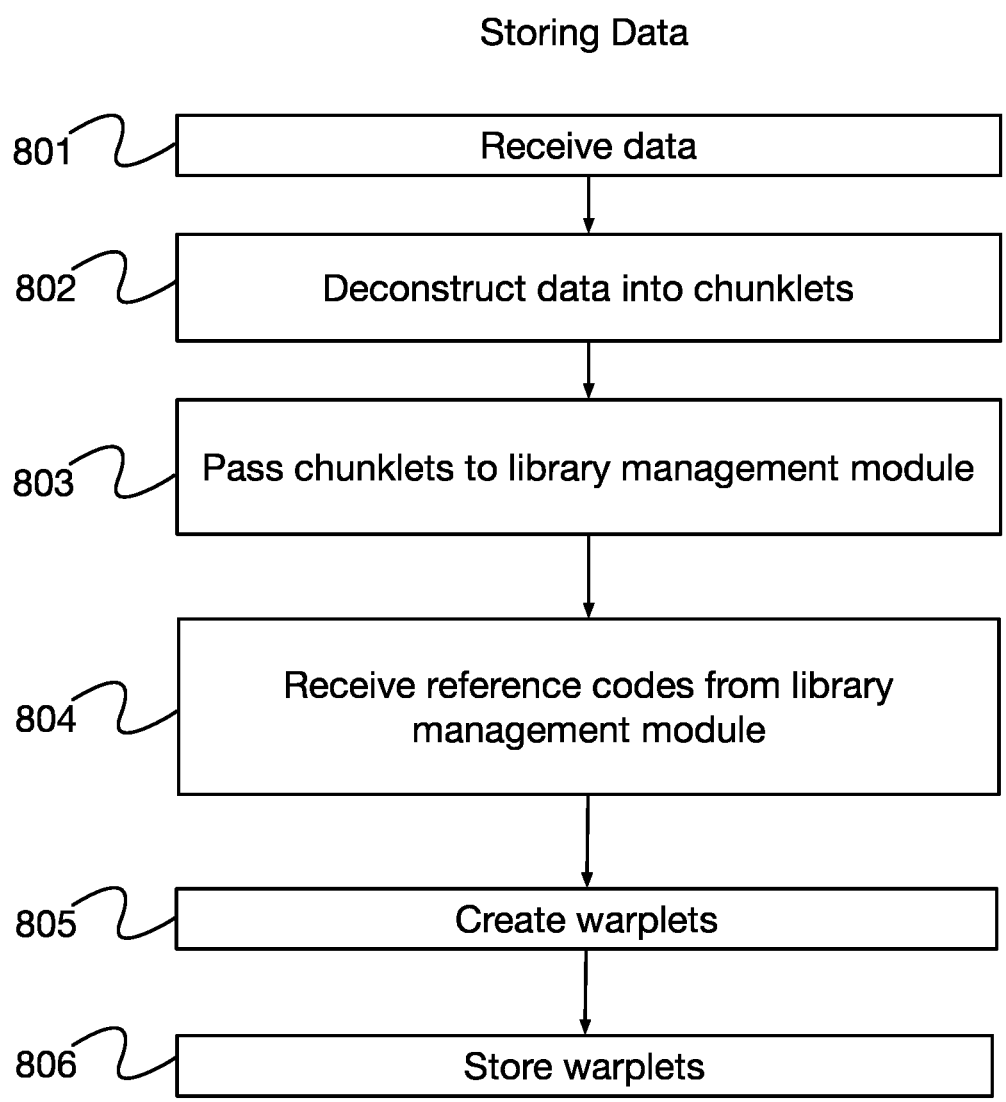
FIG. 8 is a method diagram showing the steps involved in using an embodiment to store data.

FIG. 8 is a method diagram showing the steps involved in using an embodiment 800 to store data. As data is received 801, it would be deconstructed into chunklets 802, and passed 803 to the library management module for processing. Reference codes would be received back 804 from the library management module and could be combined with location information to create warplets 805, which would then be stored 806 as representations of the original data.

Figure 9:
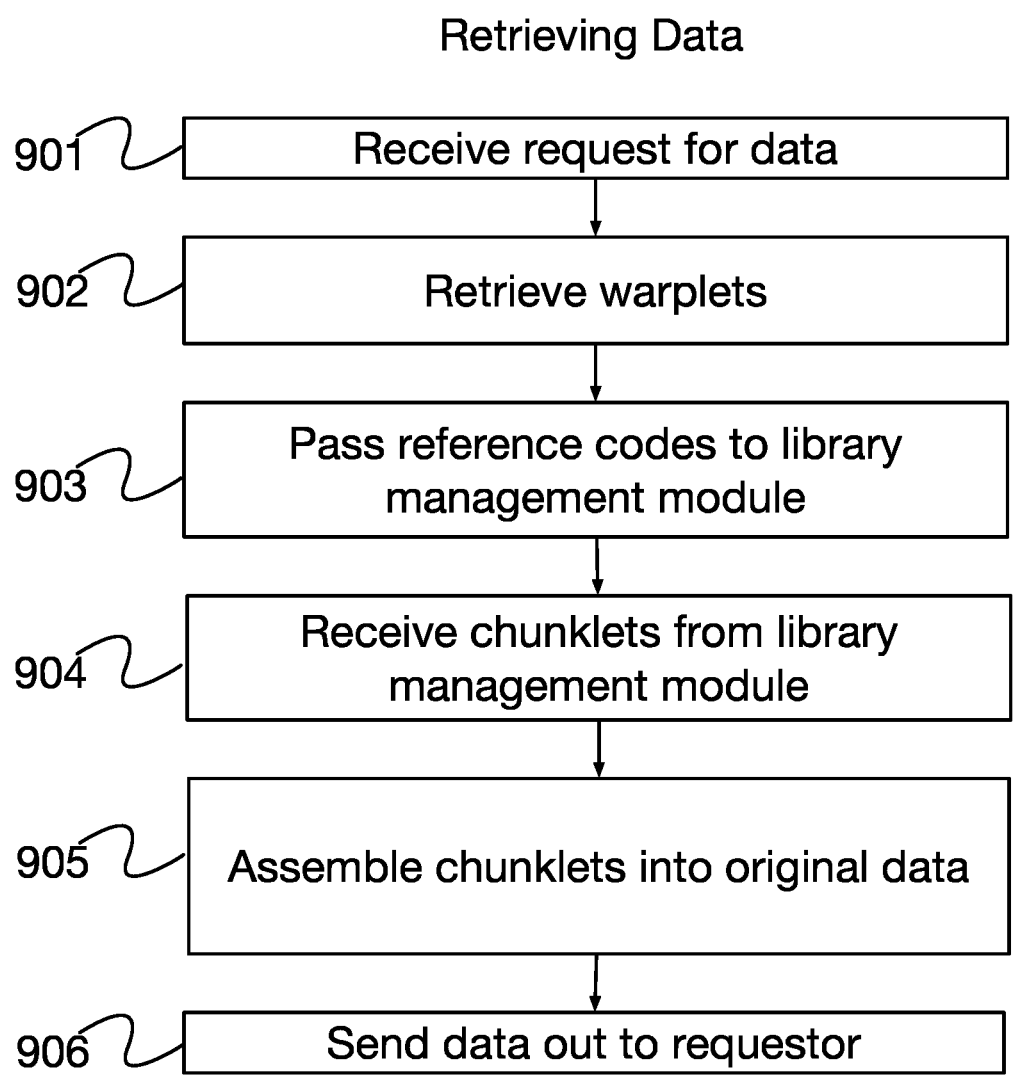
FIG. 9 is a method diagram showing the steps involved in using an embodiment to retrieve data.

FIG. 9 is a method diagram showing the steps involved in using an embodiment 900 to retrieve data. When a request for data is received 901, the associated warplets would be retrieved 902 from the library. The warplets would be passed 903 to the library management module, and the associated chunklets would be received back 904. Upon receipt, the chunklets would be assembled 905 into the original data using the location data contained in the warplets, and the reconstructed data would be sent out 906 to the requestor.

Figure 10:
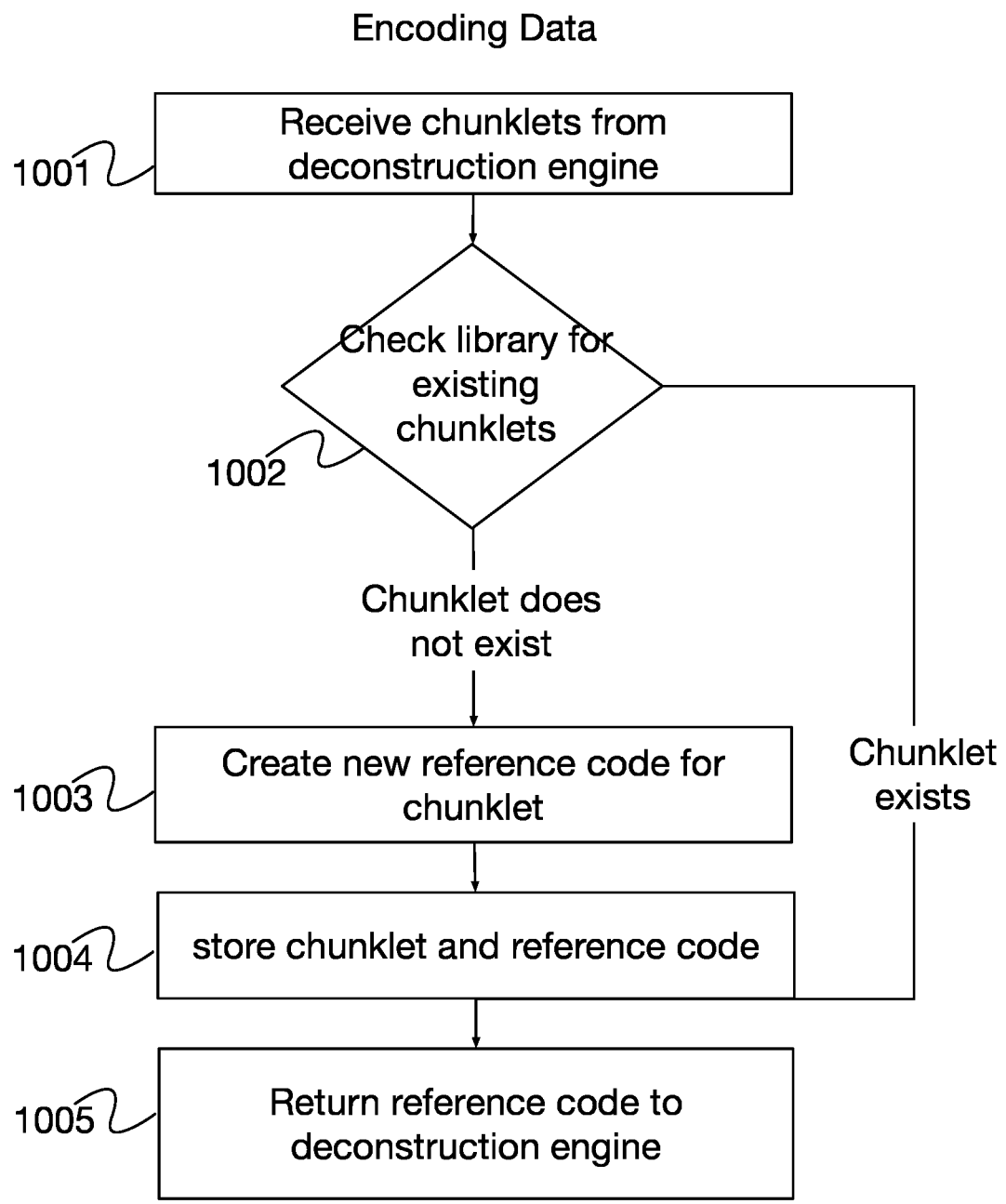
FIG. 10 is a method diagram showing the steps involved in using an embodiment to encode data.

FIG. 10 is a method diagram showing the steps involved in using an embodiment 1000 to encode data. As chunklets are received 1001 from the deconstruction engine, they would be compared 1002 with the chunklets already contained in the library. If that chunklet already exists in the library, the associated reference code would be returned 1005 to the deconstruction engine. If the chunklet does not already exist in the library, a new reference code would be created 1003 for the chunklet. The new reference code and its associated chunklet would be stored 1004 in the library, and the reference code would be returned to the deconstruction engine.

Figure 11:
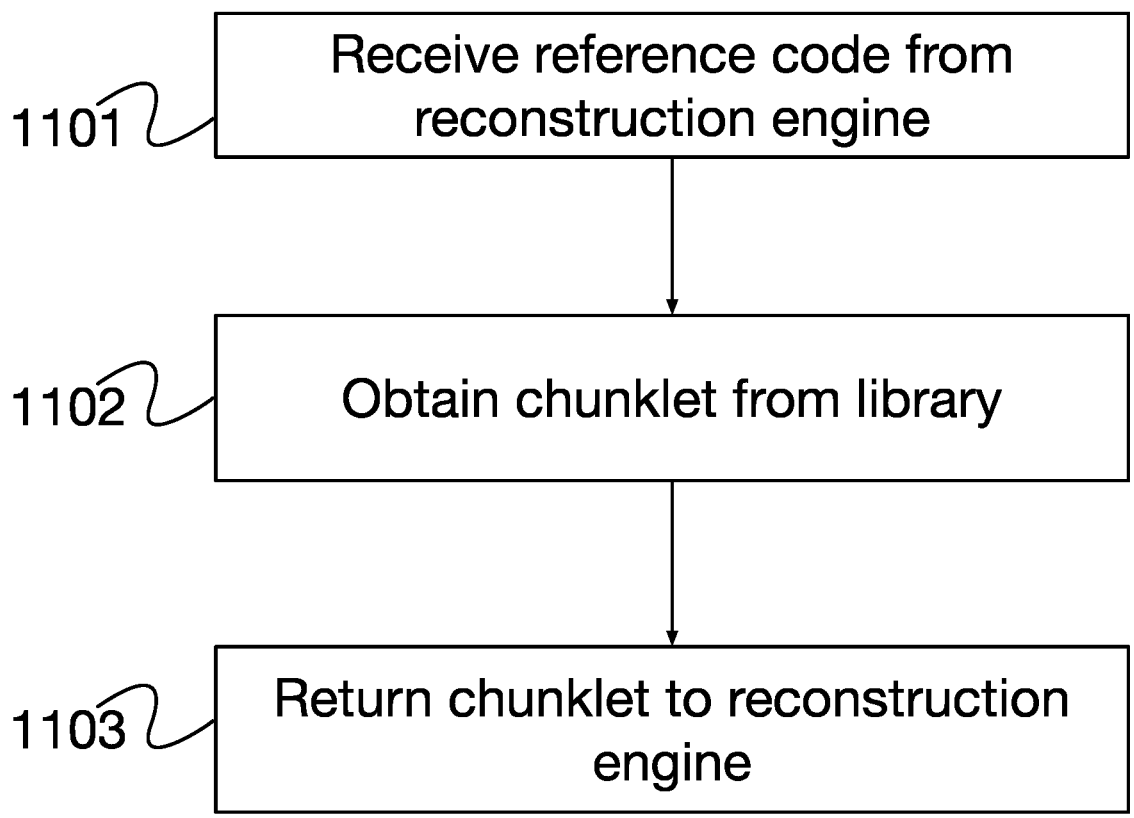
FIG. 11 is a method diagram showing the steps involved in using an embodiment to decode data.

FIG. 11 is a method diagram showing the steps involved in using an embodiment 1100 to decode data. As reference codes are received 1101 from the reconstruction engine, the associated chunklets are retrieved 1102 from the library, and returned 1103 to the reconstruction engine.

Figure 16:
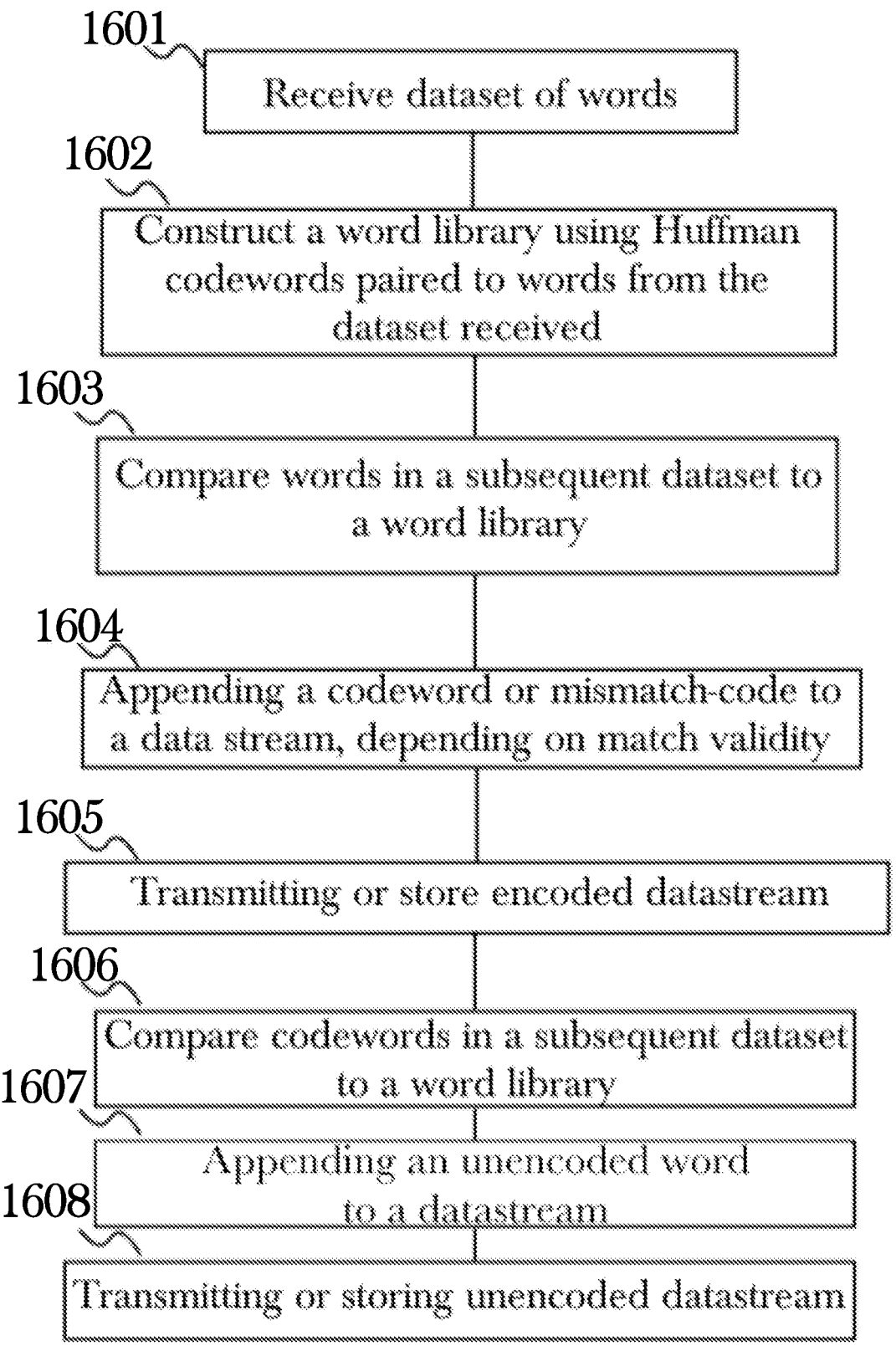
FIG. 16 is a method diagram illustrating key system functionality utilizing an encoder and decoder pair.

FIG. 16 is a method diagram illustrating key system functionality utilizing an encoder and decoder pair, according to a preferred embodiment. In a first step 1601, at least one incoming data set may be received at a customized library generator 1300 that then 1602 processes data to produce a customized word library 1201 comprising key-value pairs of data words (each comprising a string of bits) and their corresponding calculated binary Huffman codewords. A subsequent dataset may be received and compared to the word library 1603 to determine the proper codewords to use in order to encode the dataset. Words in the dataset are checked against the word library and appropriate encodings are appended to a data stream 1604. If a word is mismatched within the word library and the dataset, meaning that it is present in the dataset but not the word library, then a mismatched code is appended, followed by the unencoded original word. If a word has a match within the word library, then the appropriate codeword in the word library is appended to the data stream. Such a data stream may then be stored or transmitted 1605 to a destination as desired. For the purposes of decoding, an already-encoded data stream may be received and compared 1606, and un-encoded words may be appended to a new data stream 1607 depending on word matches found between the encoded data stream and the word library that is present. A matching codeword that is found in a word library is replaced with the matching word and appended to a data stream, and a mismatch code found in a data stream is deleted and the following unencoded word is re-appended to a new data stream, the inverse of the process of encoding described earlier. Such a data stream may then be stored or transmitted 1608 as desired.

Figure 17:
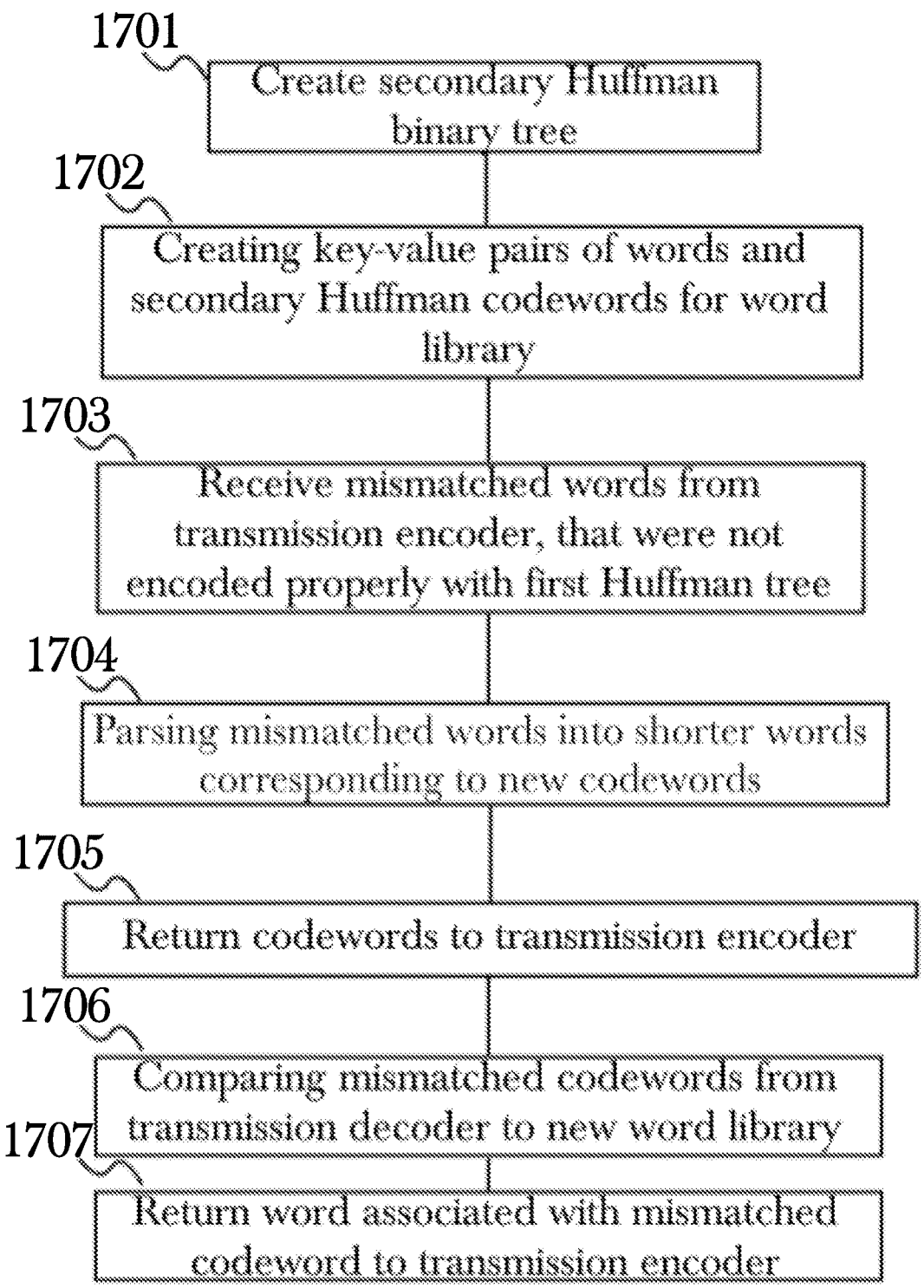
FIG. 17 is a method diagram illustrating possible use of a hybrid encoder/decoder to improve the compression ratio.

FIG. 17 is a method diagram illustrating possible use of a hybrid encoder/decoder to improve the compression ratio, according to a preferred aspect. A second Huffman binary tree may be created 1701, having a shorter maximum length of codewords than a first Huffman binary tree 1602, allowing a word library to be filled with every combination of codeword possible in this shorter Huffman binary tree 1702. A word library may be filled with these Huffman codewords and words from a dataset 1702, such that a hybrid encoder/decoder 1304, 1503 may receive any mismatched words from a dataset for which encoding has been attempted with a first Huffman binary tree 1703, 1604 and parse previously mismatched words into new partial codewords (that is, codewords that are each a substring of an original mismatched codeword) using the second Huffman binary tree 1704. In this way, an incomplete word library may be supplemented by a second word library. New codewords attained in this way may then be returned to a transmission encoder 1705, 1500. In the event that an encoded dataset is received for decoding, and there is a mismatch code indicating that additional coding is needed, a mismatch code may be removed and the unencoded word used to generate a new codeword as before 1706, so that a transmission encoder 1500 may have the word and newly generated codeword added to its word library 1707, to prevent further mismatching and errors in encoding and decoding.

It will be recognized by a person skilled in the art that the methods described herein can be applied to data in any form. For example, the method described herein could be used to store genetic data, which has four data units: C, G, A, and T. Those four data units can be represented as 2 bit sequences: 00, 01, 10, and 11, which can be processed and stored using the method described herein.

It will be recognized by a person skilled in the art that certain embodiments of the methods described herein may have uses other than data storage. For example, because the data is stored in reference code form, it cannot be reconstructed without the availability of the library of chunklets. This is effectively a form of encryption, which could be used for cyber security purposes. As another example, an embodiment of the method described herein could be used to store backup copies of data, provide for redundancy in the event of server failure, or provide additional security against cyberattacks by distributing multiple partial copies of the library among computers are various locations, ensuring that at least two copies of each chunklet exist in different locations within the network.

Figure 18:
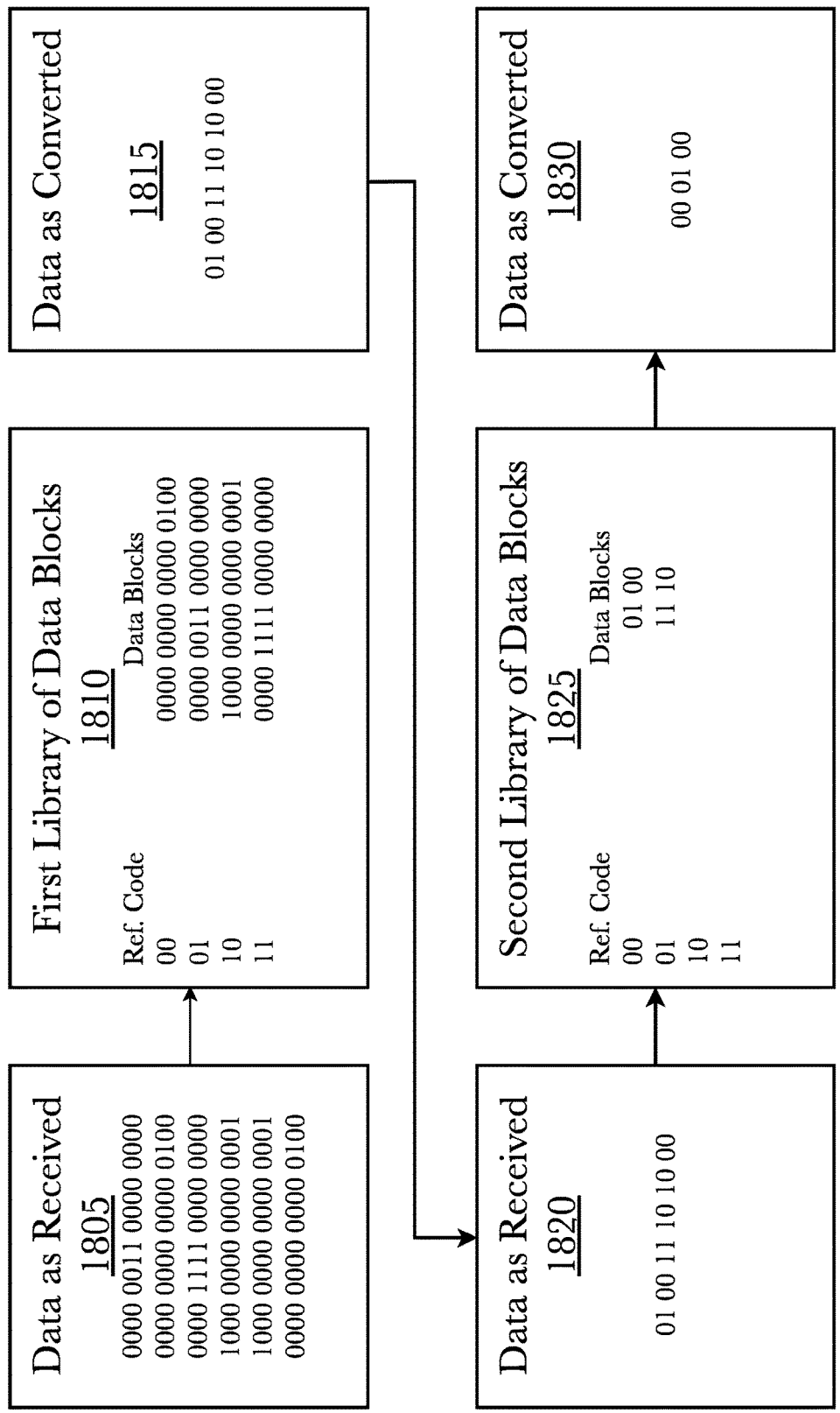
FIG. 18 is a flow diagram illustrating the use of a data encoding system used to recursively encode data to further reduce data size.

FIG. 18 is a flow diagram illustrating the use of a data encoding system used to recursively encode data to further reduce data size. Data may be input 1805 into a data deconstruction engine 102 to be deconstructed into code references, using a library of code references based on the input 1810. Such example data is shown in a converted, encoded format 1815, highly compressed, reducing the example data from 96 bits of data, to 12 bits of data, before sending this newly encoded data through the process again 1820, to be encoded by a second library 1825, reducing it even further. The newly converted data 1830 is shown as only 6 bits in this example, thus a size of 6.25% of the original data packet. With recursive encoding, then, it is possible and implemented in the system to achieve increasing compression ratios, using multi-layered encoding, through recursively encoding data. Both initial encoding libraries 1810 and subsequent libraries 1825 may be achieved through machine learning techniques to find optimal encoding patterns to reduce size, with the libraries being distributed to recipients prior to transfer of the actual encoded data, such that only the compressed data 1830 must be transferred or stored, allowing for smaller data footprints and bandwidth requirements. This process can be reversed to reconstruct the data. While this example shows only two levels of encoding, recursive encoding may be repeated any number of times. The number of levels of recursive encoding will depend on many factors, a non-exhaustive list of which includes the type of data being encoded, the size of the original data, the intended usage of the data, the number of instances of data being stored, and available storage space for codebooks and libraries. Additionally, recursive encoding can be applied not only to data to be stored or transmitted, but also to the codebooks and/or libraries, themselves. For example, many installations of different libraries could take up a substantial amount of storage space. Recursively encoding those different libraries to a single, universal library would dramatically reduce the amount of storage space required, and each different library could be reconstructed as necessary to reconstruct incoming streams of data.

Figure 20:
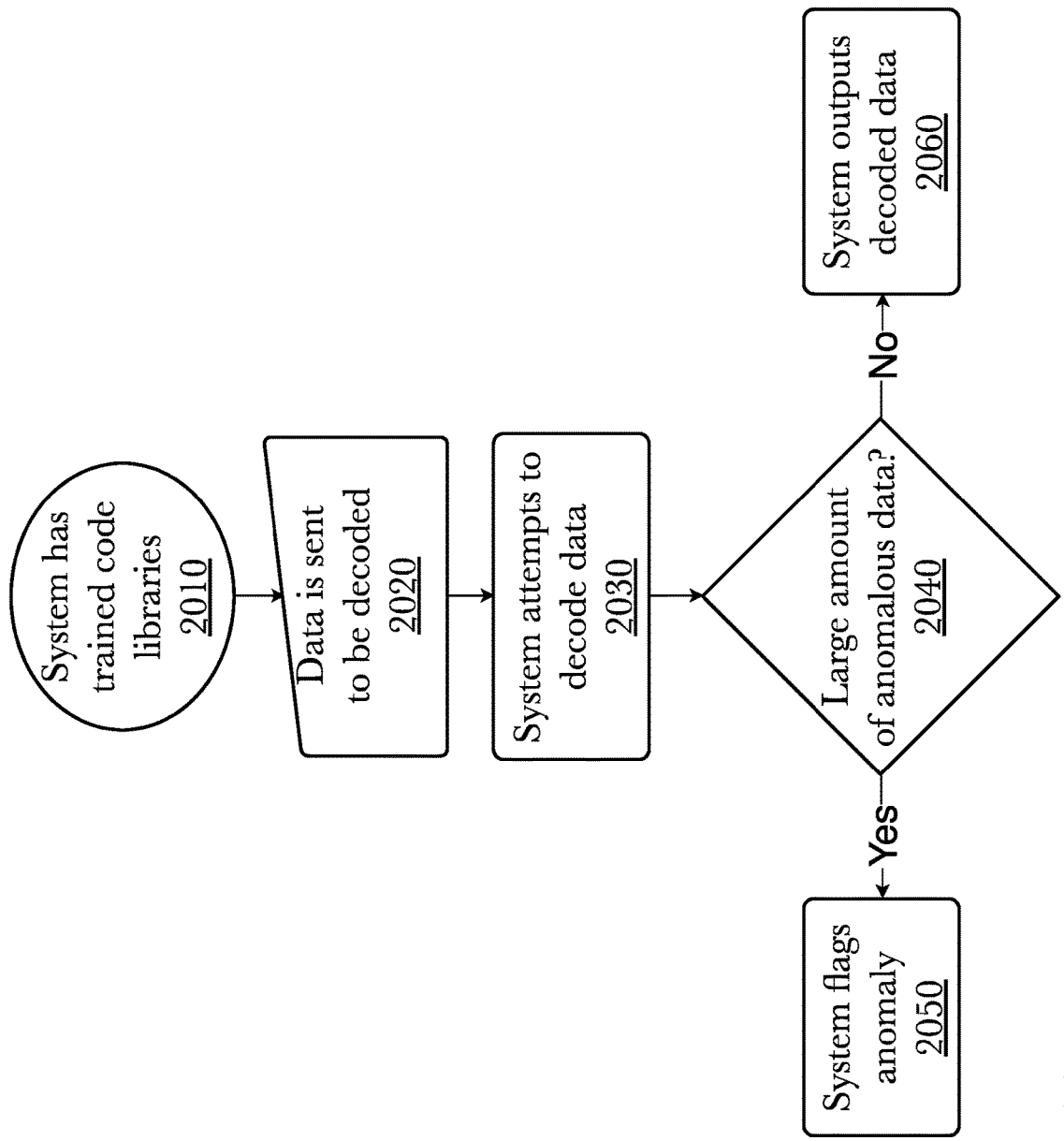
FIG. 20 is a flow diagram of an exemplary method used to detect anomalies in received encoded data and producing a warning.

FIG. 20 is a flow diagram of an exemplary method used to detect anomalies in received encoded data and producing a warning. A system may have trained encoding libraries 2010, before data is received from some source such as a network connected device or a locally connected device including USB connected devices, to be decoded 2020. Decoding in this context refers to the process of using the encoding libraries to take the received data and attempt to use encoded references to decode the data into its original source 2030, potentially more than once if recursive encoding was used, but not necessarily more than once. An anomaly detector 1910 may be configured to detect a large amount of un-encoded data 2040 in the midst of encoded data, by locating data or references that do not appear in the encoding libraries, indicating at least an anomaly, and potentially data tampering or faulty encoding libraries. A flag or warning is set by the system 2050, allowing a user to be warned at least of the presence of the anomaly and the characteristics of the anomaly. However, if a large amount of invalid references or unencoded data are not present in the encoded data that is attempting to be decoded, the data may be decoded and output as normal 2060, indicating no anomaly has been detected.

Figure 21:
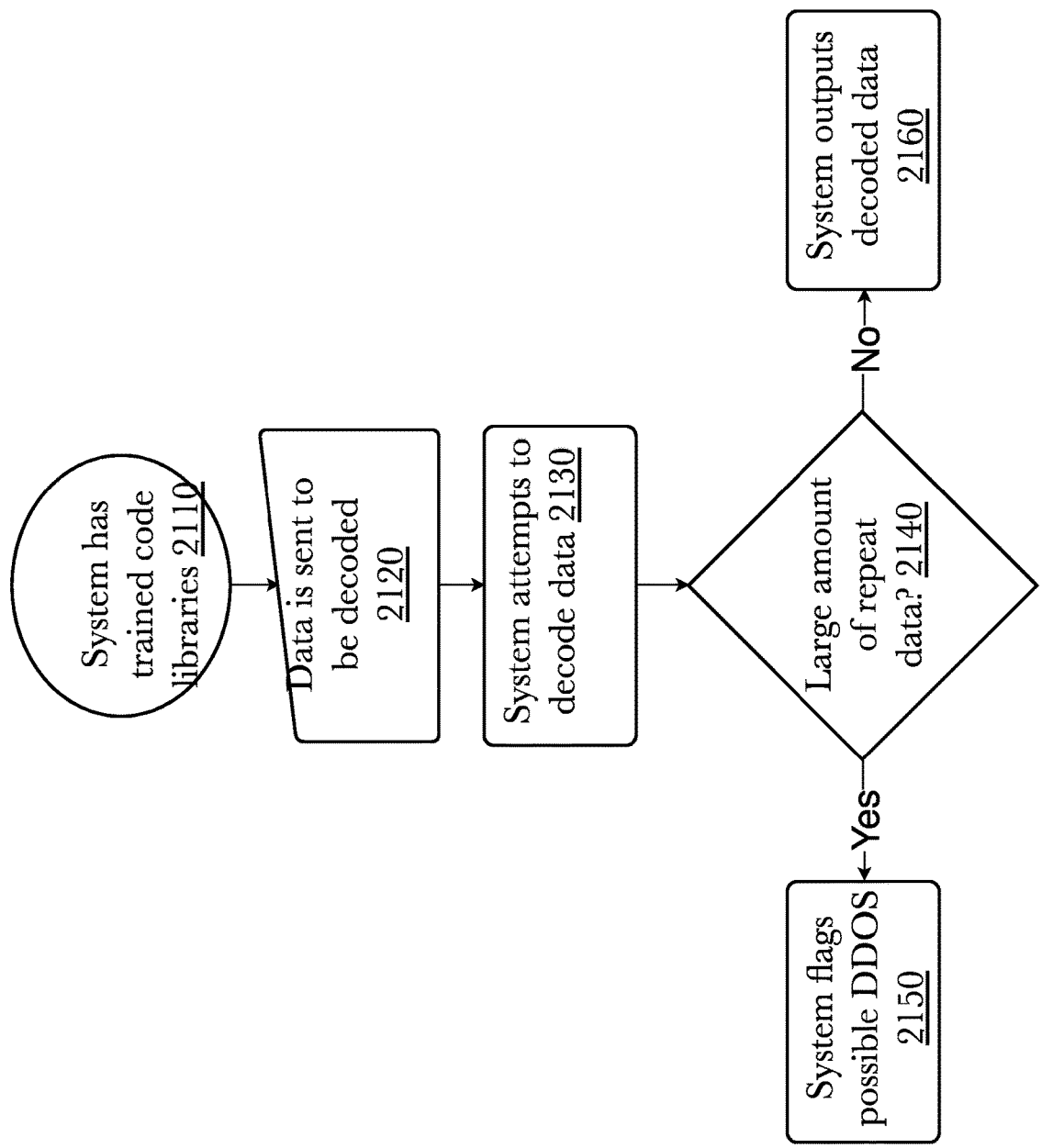
FIG. 21 is a flow diagram of a data encoding system used for Distributed Denial of Service (DDoS) attack denial.

FIG. 21 is a flow diagram of a method used for Distributed Denial of Service (DDoS) attack denial. A system may have trained encoding libraries 2110, before data is received from some source such as a network connected device or a locally connected device including USB connected devices, to be decoded 2120. Decoding in this context refers to the process of using the encoding libraries to take the received data and attempt to use encoded references to decode the data into its original source 2130, potentially more than once if recursive encoding was used, but not necessarily more than once. A DDoS detector 1920 may be configured to detect a large amount of repeating data 2140 in the encoded data, by locating data or references that repeat many times over (the number of which can be configured by a user or administrator as need be), indicating a possible DDoS attack. A flag or warning is set by the system 2150, allowing a user to be warned at least of the presence of a possible DDoS attack, including characteristics about the data and source that initiated the flag, allowing a user to then block incoming data from that source. However, if a large amount of repeat data in a short span of time is not detected, the data may be decoded and output as normal 2160, indicating no DDoS attack has been detected.

Figure 23:
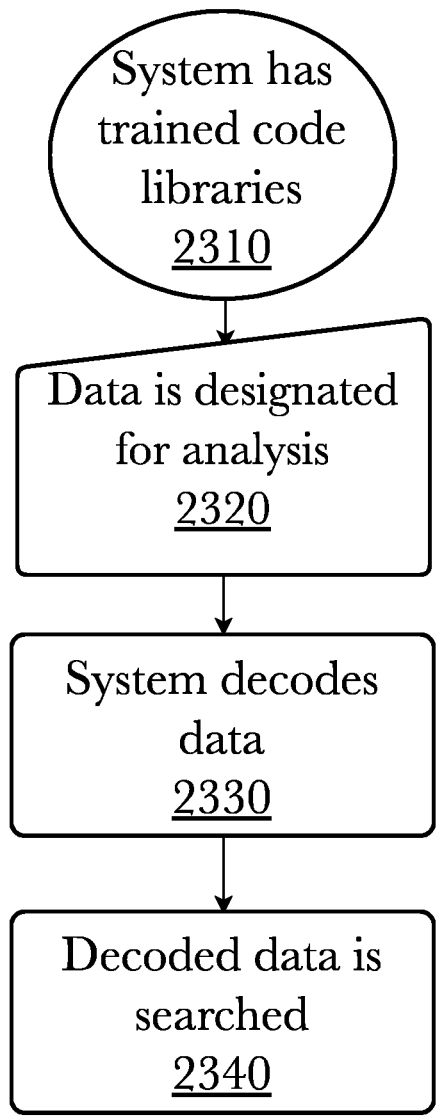
FIG. 23 is a flow diagram of an exemplary method used to enable high-speed data mining of repetitive data.

FIG. 23 is a flow diagram of an exemplary method used to enable high-speed data mining of repetitive data. A system may have trained encoding libraries 2310, before data is received from some source such as a network connected device or a locally connected device including USB connected devices, to be analyzed 2320 and decoded 2330. When determining data for analysis, users may select specific data to designate for decoding 2330, before running any data mining or analytics functions or software on the decoded data 2340. Rather than having traditional decryption and decompression operate over distributed drives, data can be regenerated immediately using the encoding libraries disclosed herein, as it is being searched. Using methods described in FIG. 9 and FIG. 11, data can be stored, retrieved, and decoded swiftly for searching, even across multiple devices, because the encoding library may be on each device. For example, if a group of servers host warplets relevant for data mining purposes, a single computer can request these warplets, and the warplets can be sent to the recipient swiftly over the bandwidth of their connection, allowing the recipient to locally decode the data for immediate evaluation and searching, rather than running slow, traditional decompression algorithms on data stored across multiple devices or transfer larger sums of data across limited bandwidth.

Figure 25:
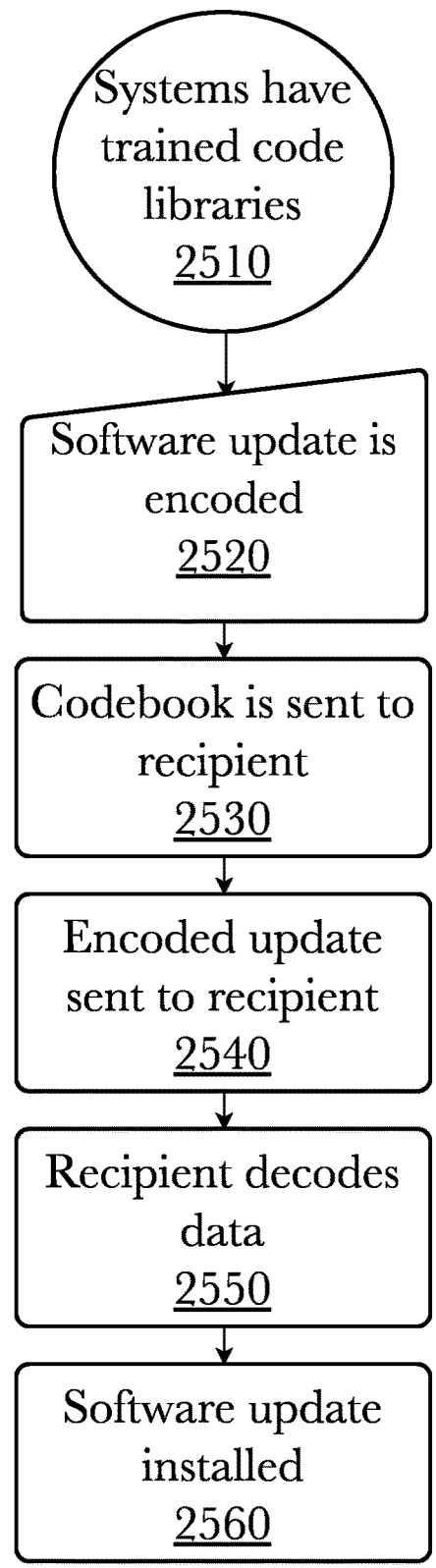
FIG. 25 is a flow diagram of an exemplary method used to encode and transfer software and firmware updates to a device for installation, for the purposes of reduced bandwidth consumption.

FIG. 25 is a flow diagram of an exemplary method used to encode and transfer software and firmware updates to a device for installation, for the purposes of reduced bandwidth consumption. A first system may have trained code libraries or "codebooks" present 2510, allowing for a software update of some manner to be encoded 2520. Such a software update may be a firmware update, operating system update, security patch, application patch or upgrade, or any other type of software update, patch, modification, or upgrade, affecting any computer system. A codebook for the patch must be distributed to a recipient 2530, which may be done beforehand and either over a network or through a local or physical connection, but must be accomplished at some point in the process before the update may be installed on the recipient device 2560. An update may then be distributed to a recipient device 2540, allowing a recipient with a codebook distributed to them 2530 to decode the update 2550 before installation 2560. In this way, an encoded and thus heavily compressed update may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 27:
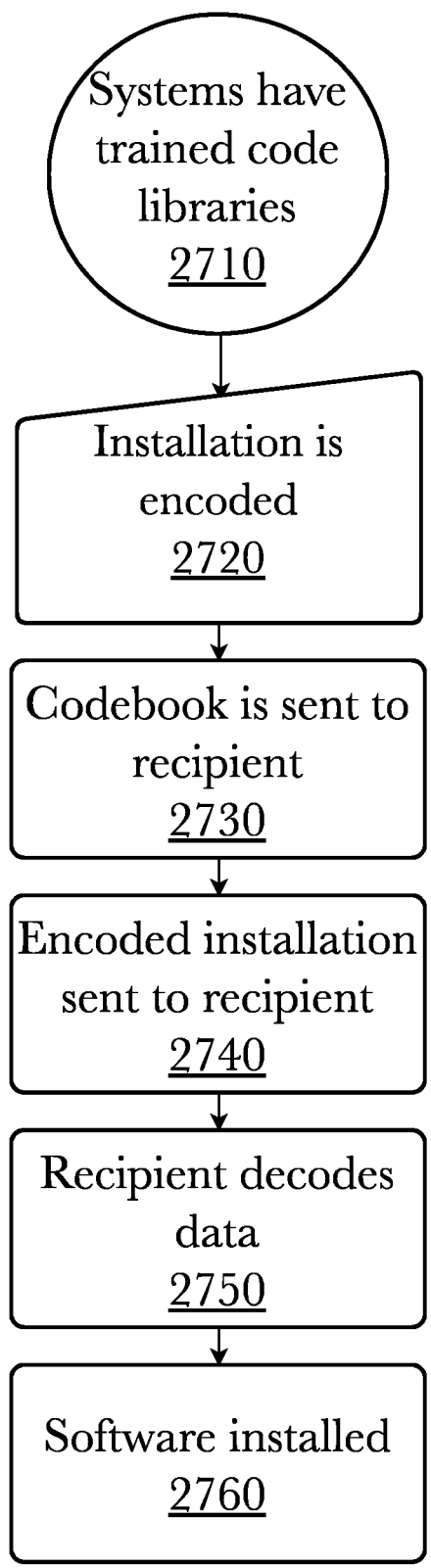
FIG. 27 is a flow diagram of an exemplary method used to encode new software and operating system installations for reduced bandwidth required for transference.

FIG. 27 is a flow diagram of an exemplary method used to encode new software and operating system installations for reduced bandwidth required for transference. A first system may have trained code libraries or "codebooks" present 2710, allowing for a software installation of some manner to be encoded 2720. Such a software installation may be a software update, operating system, security system, application, or any other type of software installation, execution, or acquisition, affecting a computer system. An encoding library or "codebook" for the installation must be distributed to a recipient 2730, which may be done beforehand and either over a network or through a local or physical connection, but must be accomplished at some point in the process before the installation can begin on the recipient device 2760. An installation may then be distributed to a recipient device 2740, allowing a recipient with a codebook distributed to them 2730 to decode the installation 2750 before executing the installation 2760. In this way, an encoded and thus heavily compressed software installation may be sent to a recipient far quicker and with less bandwidth usage than traditional lossless compression methods for data, or when sending data in uncompressed formats. This especially may benefit large distributions of software and software updates, as with enterprises updating large numbers of devices at once.

Figure 30:
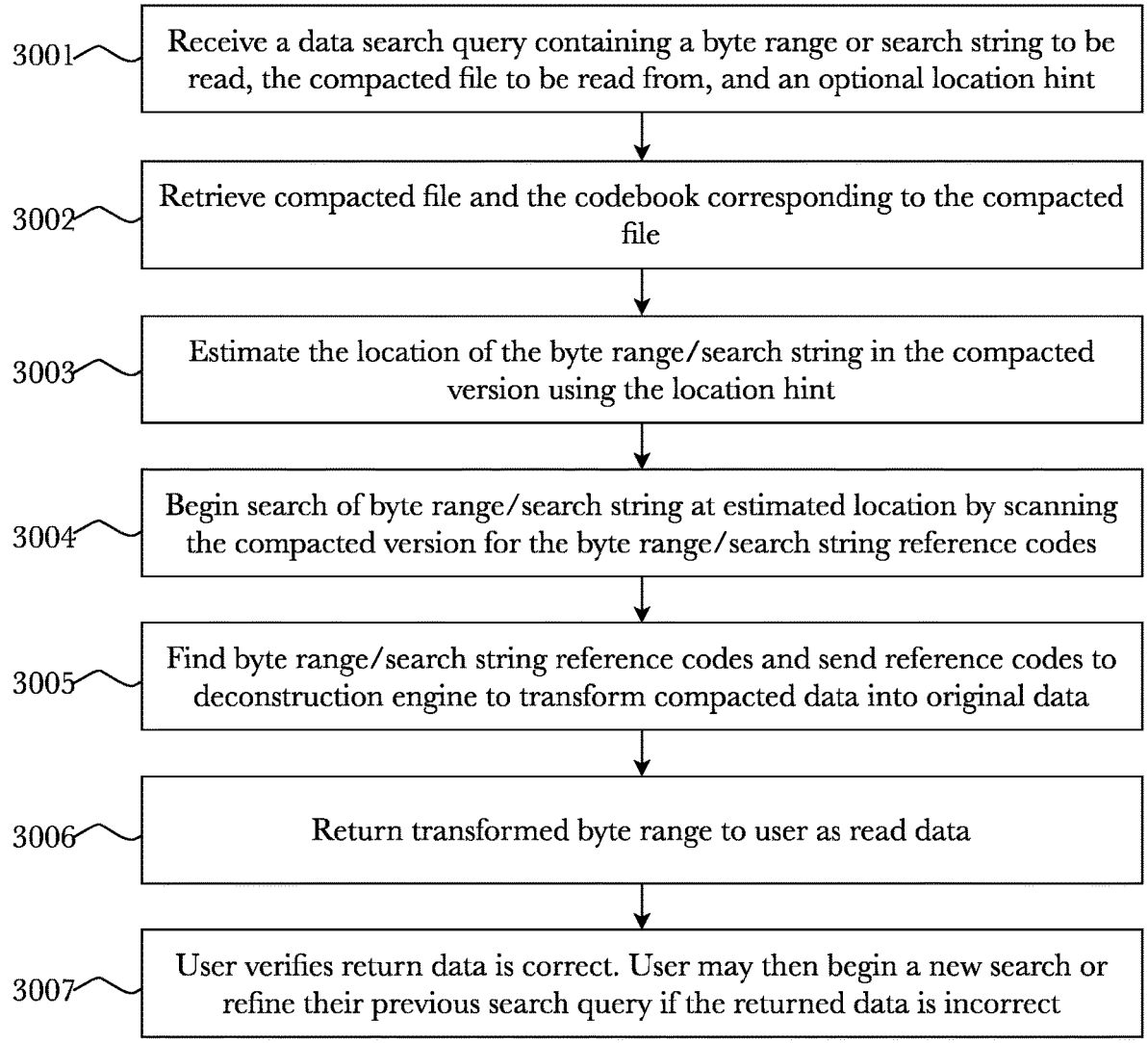
FIG. 30 is a flow diagram of an exemplary method used to search and read data from a compacted data file.

FIG. 30 is a flow diagram of an exemplary method used to search and read data from a compacted data file. For the purposes of this example drawing only, the original file is an ASCII (text) file, however, it should be understood that this method is applicable across a broad range of data types and formats. A data search query comprising a byte range or search string to be searched for and read, a compacted file to be read from, and an optional location hint from which to begin the search 3001 is received by the system. The data search query is parsed and both the compacted data file and its corresponding codebook is retrieved 3002. If a location hint was provided in the data read query, then an estimated location within the compacted version is generated using the location hint 3003. The location hint may include, but is not limited to a single byte location, a guess such as "start at the 60% mark", and a search operator such as (e.g. "near", "not", etc.). The next step begins to search for the byte range/search word at the estimated location by scanning the compacted version for the byte range/search string reference codes 3004. This step may find the starting bit location that corresponds with the beginning of the search term (i.e. byte range, search string) and retrieve a plurality of bits beginning with the starting bit, the plurality of bits represent the compacted version of the search term. The search may be done via a binary search starting from the estimated location. The search step may further involve in generating at least one or more possible sets of encodings for the search string, creating a search pair by concatenating encodings from the same set, and then searching for the search pair within the compacted data file. Once the byte range/search string has been located, its reference codes are sent to a deconstruction engine to transform the compacted data into its original form 3005. The transformed data is returned to the user as read data 3006. The user may then verify that the returned data is correct and can begin a new query process 3007.

Figure 31:
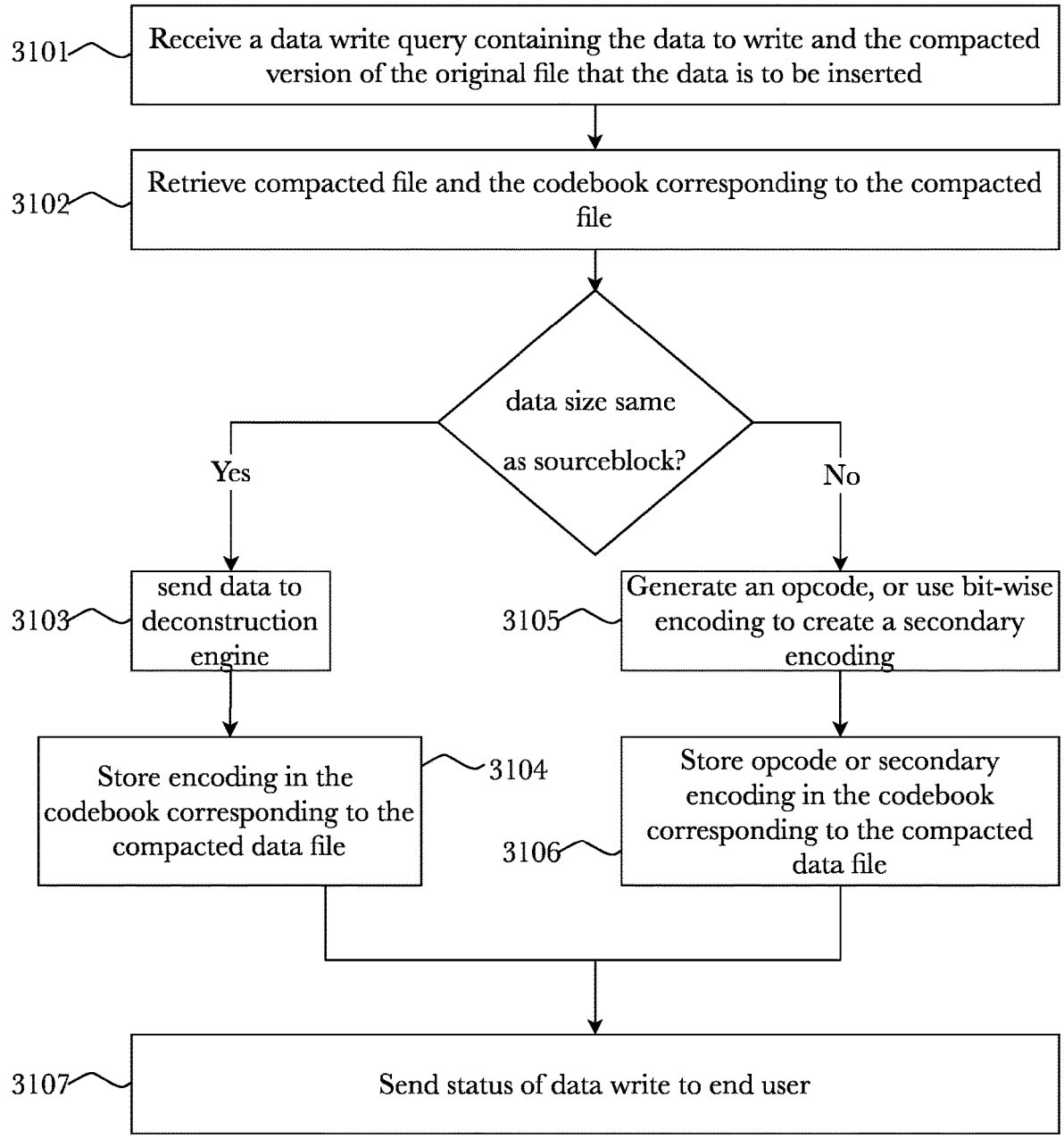
FIG. 31 is a flow diagram of an exemplary method used to write data to a compacted data file.

FIG. 31 is a flow diagram of an exemplary method used to write data to a compacted data file. The process begins when a data write query is received by the system, the data write query may be comprised of a write term (data to write) and an identified compacted data file that the write term is to be inserted into 3101. Then, the identified compacted data file and the codebook corresponding to the compacted data file is retrieved 3102. Next, the length of the write term to be inserted is checked and compared against the length of the sourceblock. If the data is the same size as the sourceblock then it can simply be encoded 3103 and stored within the codebook corresponding to the compacted data file 3104. If the data is not the same size as the sourceblock, then the system may generate an opcode or use bit-wise encoding to create a secondary encoding 3105. Writing a data file that is larger than the sourceblock can modify the output of codewords globally. To counter this, an opcode may be generated that accounts for the newly inserted data. The opcode can alert the decoder to apply an offset when decoding, thus accounting for the insertion of data into the original data file. In another embodiment, instead of using an opcode, unused bits in the codebook are used to indicate a secondary encoding. A secondary encoding indicates that data was inserted into a file, and that at the next location there are two or more possible encodings. If such a bit is encountered it means there is a secondary encoding coming up, and the encoder can switch to secondary encoding, encode one fewer byte, and then resume encoding as before. In this way there is no need to apply an offset, just use existing extra bits to create secondary encodings which prevents having to re-encode the entire original file including the inserted data. The generated opcode or the encoded bits are stored within the codebook corresponding to the compacted data file 3106. A confirmation of a successful data write process is sent to the end user 3107.

Figure 32:
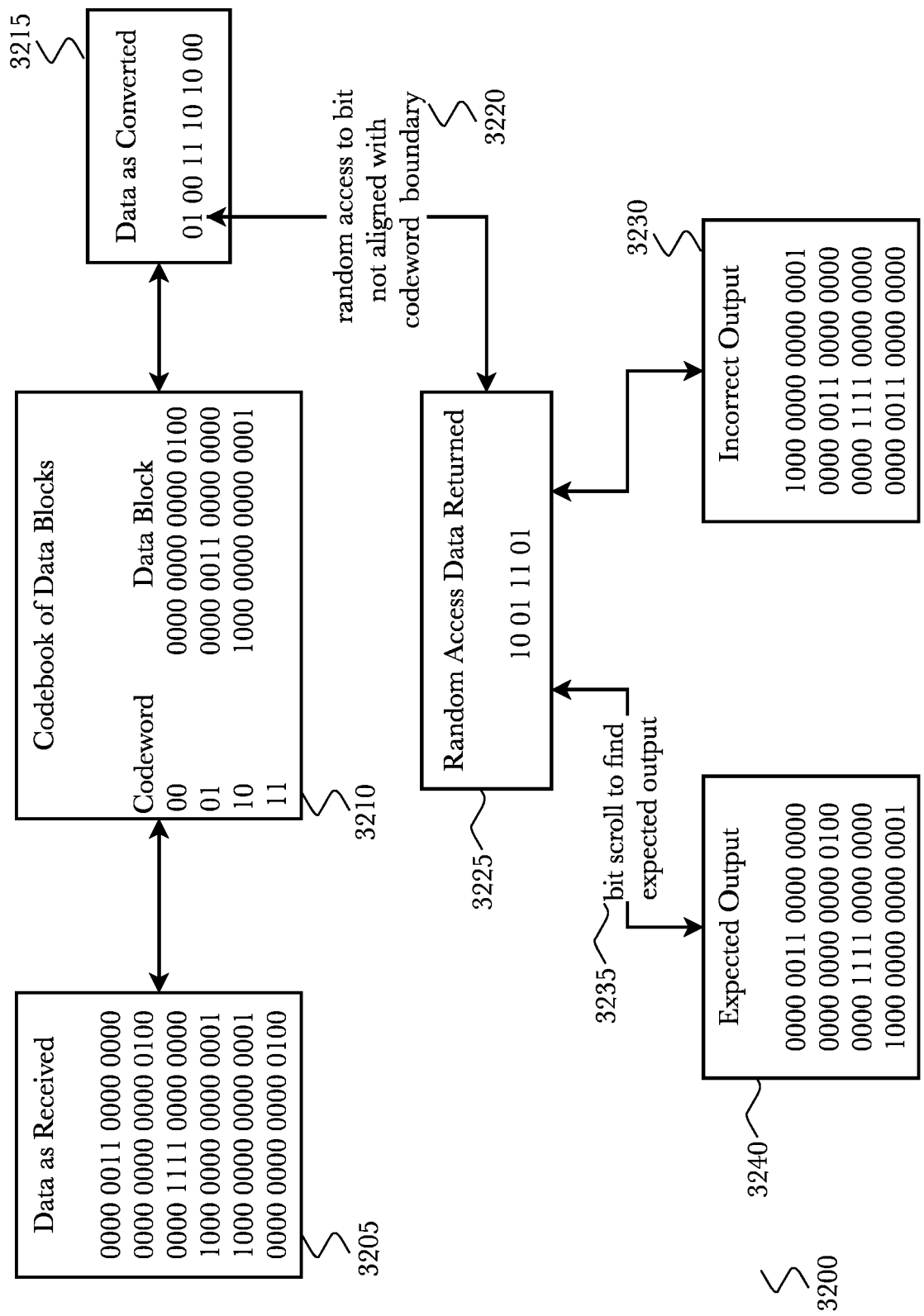
FIG. 32 is a diagram showing an example of how data might be converted into reference codes, how the converted data randomly accessed may result in incorrect output, and how correct data may be located, according to an embodiment.

FIG. 32 is a diagram showing an example of how data might be converted into reference codes, how the converted data randomly accessed may result in incorrect output, and how correct data may be located, according to an embodiment 3200. As data is received 3205, it is read by the processor in chunklets of a size dynamically determined by the previously disclosed chunklet size optimizer 410. In this example, each chunklet is 16 bits in length, and the codebook 3210 initially contains three chunklets with codewords 00, 01, and 10. The entry for codeword 11 is initially empty. As each 16 bit chunklet is received, it is compared with the codebook. If that chunklet is already contained in the codebook, it is assigned the corresponding codeword. So, for example, as the first line of data (0000 0011 0000 0000) is received, it is assigned the codeword (01) associated with that chunklet in the codebook. If that chunklet is not already contained in the codebook, as is the case with the third line of data (0000 1111 0000 0000) received in the example, that chunklet is added to the codebook and assigned a codeword, in this case 11. The data is thus converted 3215 to a series of codewords to chunklets in the codebook. The data is stored as a collection of warplets, each of which contains the codeword to a chunklet and information about the location of the chunklets in the data set. Reconstructing the data is performed by reversing the process. Each stored codeword in a data collection is compared with the codewords in the codebook, the corresponding chunklet is read from the codebook, and the data is reconstructed into its original form.

A data search query specifying a search term to read from the original data set. In this example, the selected search term captures to the first four lines of the data as received 3205. The system estimates a bit location N' in the converted data set that corresponds to byte N in the original data set. The estimated location, bit N', may not be aligned with a codeword boundary 3220. In this example, the first codeword that should be accessed and returned is supposed to be 01, but the estimate N' location puts the pointer at the last bit in the codeword 3220. When N' is not aligned with a codeword boundary, the system will start decoding in the middle of a codeword, resulting in returned data 3225 that when decoded leads to incorrect output 3230. Due to the boundary misalignment, the random access data returned is 10 01 11 01 3225, when the correct random access data returned should have been 01 00 11 10. The user that submits the data search query will receive the incorrect output and recognize it as garbage output. The user can manually bit scroll 3235 forward and backward from N' until a codeword boundary is found and the expected output 3240 corresponding to the search term is returned.

In another embodiment, mile markers are stored in a file accompanying the compacted data set with a list of exact locations N' in the compacted data set that correspond to N=100, 200, 1000, etc. The mile marker file enables more refined estimates of N' with less seeking necessary as now the user may seek forwards and backwards in the compacted data set in codeword increments and boundary alignment is automatic. These mile markers (i.e. locations) might denote which bit corresponds to the $1000^{th}$ byte from the unencoded data, which bit corresponds to the $2000^{th}$ byte, etc. The use of mile markers prevents the possibility of starting the data read process in the middle of codeword as any search may begin at the nearest mile marker bit associated with byte N.

Figure 33:
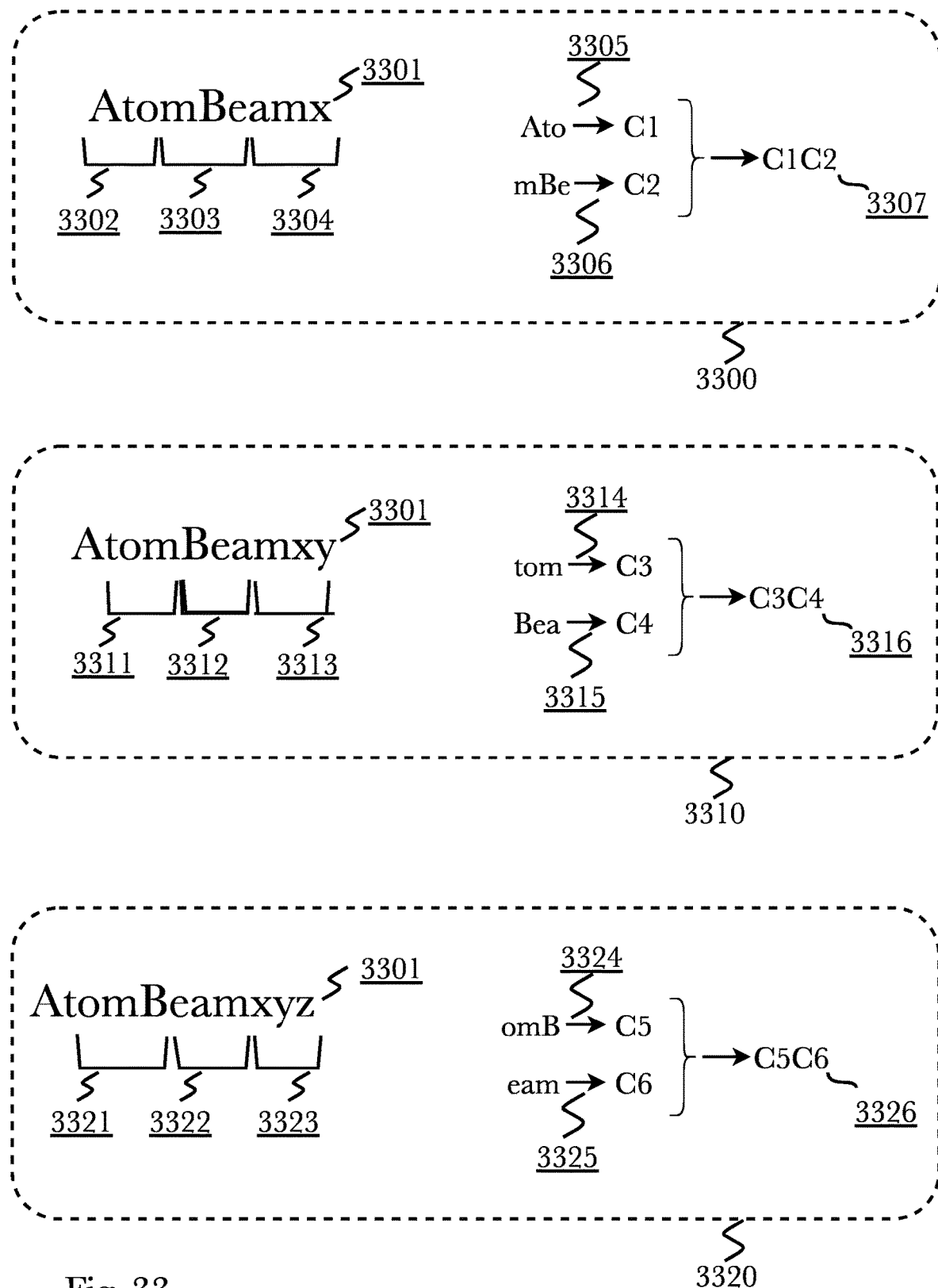
FIG. 33 is a diagram showing an exemplary process of parsing a search string using multiple encodings, according to an embodiment.

FIG. 33 is a diagram showing an exemplary process of parsing a search term using multiple encodings, according to an embodiment. In this example, the search term is a search string. The original data file was divided into chunklets, and the size of these chunklets are referred to as the sourceblock length. A search string may be reasonably long compared to the sourceblock length, such as two or three times the sourceblock length. There may be multiple possible encodings of the search string that occur, because the sourceblock might not be aligned to a boundary of the search string. For example, the if the search string was "AtomBeam" 3301 and the sourceblock length is three bytes, there may be three separate encodings 3300, 3310, 3320 of the search string. The first encoding 3300 of the search string may be "Ato" 3302, "mBe" 3303, and "amx" 3304 where "x" is something that is not relevant to the search string. The second encoding 3310 may be "tom" 3311, "Bea" 3312, and "mxy" 3313 where "x" and "y" are not relevant to the search string. The third 3320 encoding may be "omB" 3321, "eam"3322, and "xyz" 3323 where "xyz" is not relevant to the search string. The data search engine 2940 may generate the encoding for each search string using the codebook corresponding to the compacted data file to assign a codeword to each sourceblock.

The compacted data file may then be searched for occurrences of the assigned codeword(s). For example, the "Ato" 3302 and "mBe" 3303 sourceblocks may each be encoded with codewords C1 3305 and C2 3306 respectively. These sourceblocks 3302, 3303 were selected because they both contain only data that is part of the search string 3301 and do not contain non relevant data (e.g. "x", "xy" "xyz" from preceding paragraph). The assigned codewords may be concatenated to form a codeword double (pair) C1C2 3307 and then the search engine 2940 may perform a search for codeword pair C1C2 3307 in the compacted data. This process is done for each of the possible encodings 3300, 3310, 3320 of the search string 3301.

From encoding two 3310 sourceblocks containing "tom" 3311 and "Bea" 3312 are assigned a codeword such as C3 3314 and C4 3315. These codewords may be concatenated to form a codeword pair C3C4 3316 and then the search engine 2940 may perform a search for the codeword pair C1C2 3316 in the compacted data file. Likewise, from encoding three 3320 sourceblocks containing "omB" 3321 and "eam" 3322 are assigned a codeword such as C5 3324 and C6 3325. These codewords may be concatenated to form a codeword pair C5C6 3326 and then the search engine 2940 may perform a search for the codeword pair C5C6 3326 in the compacted data file. Each of the codeword pairs C1C2 3307, C3C4 3316, and C5C6 3326 form three new search strings and the data search engine 2940 may scan through the compacted data file looking for all three of them. If any of them are found, then the codewords in the compacted data file to the left and right of the found codeword pair may be decoded to identify if the correct letter (byte) is preceding or following the codeword pair. In this example, two source blocks were used to create a codeword pair, however, it should be appreciated that number of sourceblocks concatenated is dependent upon the length of the search term and the sourceblock length. There may be codeword triples, codeword quadruples, etc., as any codeword n-tuple may be possible due to the above mentioned dependencies.

For example, if the search results return "tomBea" that means an occurrence of codeword pair C3C4 3316 was found. The search engine 2940 may decode one letter to the left side and check if it is "A" and one letter to the right to check if is "m". If those are the letters found the search string has been located, if not then it is not the correct string and the scan continues through the compacted data file until another occurrence of any one of the codeword pairs 3307, 3316, or 3326 is found. The data search engine 2940 performs this process automatically until the search string has been located or the entire compacted data file has been scanned and searched.

Figure 35:
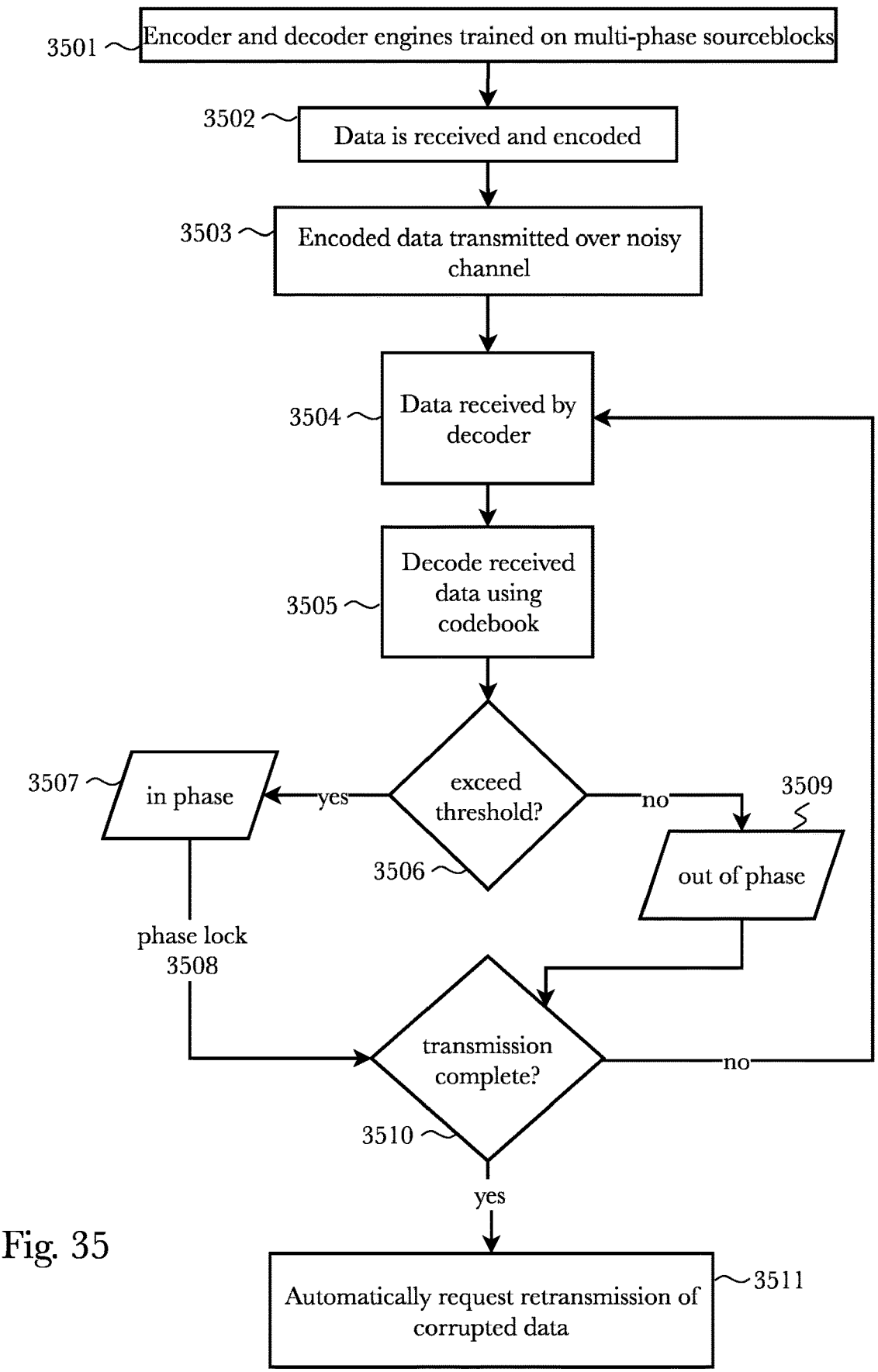
FIG. 35 is a flow diagram illustrating an exemplary method for error-resilient data reduction, according to an embodiment.

FIG. 35 is a flow diagram illustrating an exemplary method for error-resilient data reduction, according to an embodiment. The first step is to train the encoder and decoder engines (located in the deconstruction and reconstruction engines, respectively) on multi-phase sourceblocks 3501. When data is received by the system it may be encoded 3502 in the manner described in FIG. 2 and elsewhere within this disclosure. The encoded data may be transmitted over a noisy communication channel 3503. The noise on the channel may result in an error occurring to the transmitted encoded data, such as a bit-flip error, a bit deletion and/or addition, and burst type error. A bit-flip error occurs when a bit's value is flipped to its opposite. A bit deletion refers to when a binary string being transmitted loses a bit, and bit addition occurs when a binary string being transmitted gains an extra bit. Burst type error refers to when two or more bits in the data have changed from 0 to 1 or vice-versa. Data is received by the decoder 3504 and decoded using the codebook which contains all codewords and their associated sourceblock data 3505. If a bit-flip (or any other type of error) occurs in a transmitted codeword received by the decoder, the decoded data will translate it back to an incorrect sourceblock. Because both codeword lengths and the number of sourceblocks encoded in the codeword are highly variable, the end of the incorrectly-obtained codeword has only a small probability of being located at the beginning of the next codeword (i.e., the next codeword boundary). The system may check to see if the threshold probability for encodings to be correct is exceeded 3506. If the threshold is exceeded, it is located at a codeword boundary, a condition referred to as "in phase" 3507, the decoding process will generate completely correct decodings after that point because "phase lock" 3508 has occurred. If the threshold has not been exceeded, the next detected codeword will also be decoded to an incorrect sourceblock (i.e., one which disagrees with the original data). The end of that next codeword also has variable length, and so only a small probability of being "in phase" 3507. Again, if it is "in phase", all subsequent decodings will be correct, barring further errors in the communication channel, a condition referred to as "phase lock" 3508. If it is "out of phase" 3509, then these steps are repeated until a codeword boundary lands, by chance, in phase. Once this occurs, the transmission has achieved "phase lock" 3508 and the stream is thereafter decoded correctly. If the data has been fully transmitted 3510, any incorrect data received due to channel errors may be requested for retransmission 3511, otherwise the system continues to receive data 3504 and repeat the steps until the transmission is complete.

While it is possible that phase lock is never achieved, this is very highly unlikely because the probability of a codeword ending out of phase many times in a row is vanishingly low. In particular, if the average codeword length is "M" and the average sourceblock length is "N", each errant codeword can be expected to have an approximately 1/M probability of ending in phase. Thus, the average number of codewords which are incorrectly decoded before the stream self-corrects is "M", translating into an average of N*M errant bits in the original data, or $N^{2H}$ errant bits on average if the compaction ratio (encoded bits divided by original data bits) is "H" (a quantity which will usually be close to the entropy rate of the data). If a system user requires very rapid recovery, a small sourceblock length "N" will ensure this. A more error-tolerant user who wants the additional benefits of long sourceblocks may choose "N" to be larger. Under the previous assumption, the probability to return to phase lock after "t" codewords will be approximately $1-(1-1/M)^t$, or approximately $1-e^{-t/M}$. Said another way, the probability that the decoder will not have returned to phase lock and correct decoding after "T" bits of source data will be approximately $e^{-T/H*N^2}$, a quantity converging to zero exponentially fast in "T".

The system is also robust against a noisy communication channel deleting occasional bits, recovery will occur as described above once eight such deletions occur. This quantity (eight) may be changed to one if the deconstruction engine 102 is trained on sourceblocks at every phase. For example, instead of training the engine on byte-phase sourceblocks, i.e., starting locations divisible by eight, the engine may be trained on byte-phase sourceblocks with the starting locations divisible by eight with an offset such that the instead of the starting locations being located at 8, 16, 24, . . . etc., they may be located at 3, 11, 19, . . . , or 5, 13, 21, . . . etc. This may allow the engine to quickly recover from a bit deletion (and addition) because it has available data for multiple phase alignments. In this way, the error-resilient data reduction and transmission system is robust to bit-flips and bit deletion and addition.

Even if errors in the channel are persistent, the system can transmit most data faithfully as long as the channel noise is not too severe. If a channel has an error rate of "P" (i.e., each bit has probability "P" of being flipped accidentally), then the average distance between bit flips is 1/P. If this quantity is significantly larger than the average number of encoded bits until a return to phase lock, (i.e., $N^2/H$), the amount of encoded data which is correctly transmitted will be high. In particular, the fraction of correct bits will be approximately $1-P*N^2/H$, where only a $P*N^2/H$ fraction of the data will be corrupted despite persistent noise in the channel. For example, with a sourceblock size of N=8, a compaction ratio of 50% (H=0.5), and a bit-flip probability of 0.01% (P=0.0001), approximately 98.72% of the decoded data will be correct. A system user could request, or in some embodiments the system may automatically request, retransmission of only this 1.28% of the data which was received incorrectly, whereas someone using standard compression would have to request 100% retransmission.

In some embodiments, the system may further utilize efficient error-correction techniques known to those in the art, which is resistant to burst-type errors on the original data prior to the system encoding and decoding the data, so that the received data is 100% correct, at the expense of having to use additional processing power and time to perform the error-correction.

This self-correcting system may be used in conjunction with the random access engine described in detail above in FIG. 29. In this case, if a user starts to read data at an arbitrary point, the likelihood of choosing a codeword boundary (and therefore correct decodings) is low without additional support such as manual seeking, using the data model to guess codeword boundary likelihoods, or mile-markers.. However, applying self-correction means that a user could decode forward in the encoded stream even if it was chosen incorrectly, and very quickly, the reading process will become phase-locked, after which decoding can be run backwards in the stream to locate the codeword boundary close to the original starting point. In this embodiment, the random access engine 2900 may also contain a phase detector 3410 to automatically detect when phase lock occurs.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 36:
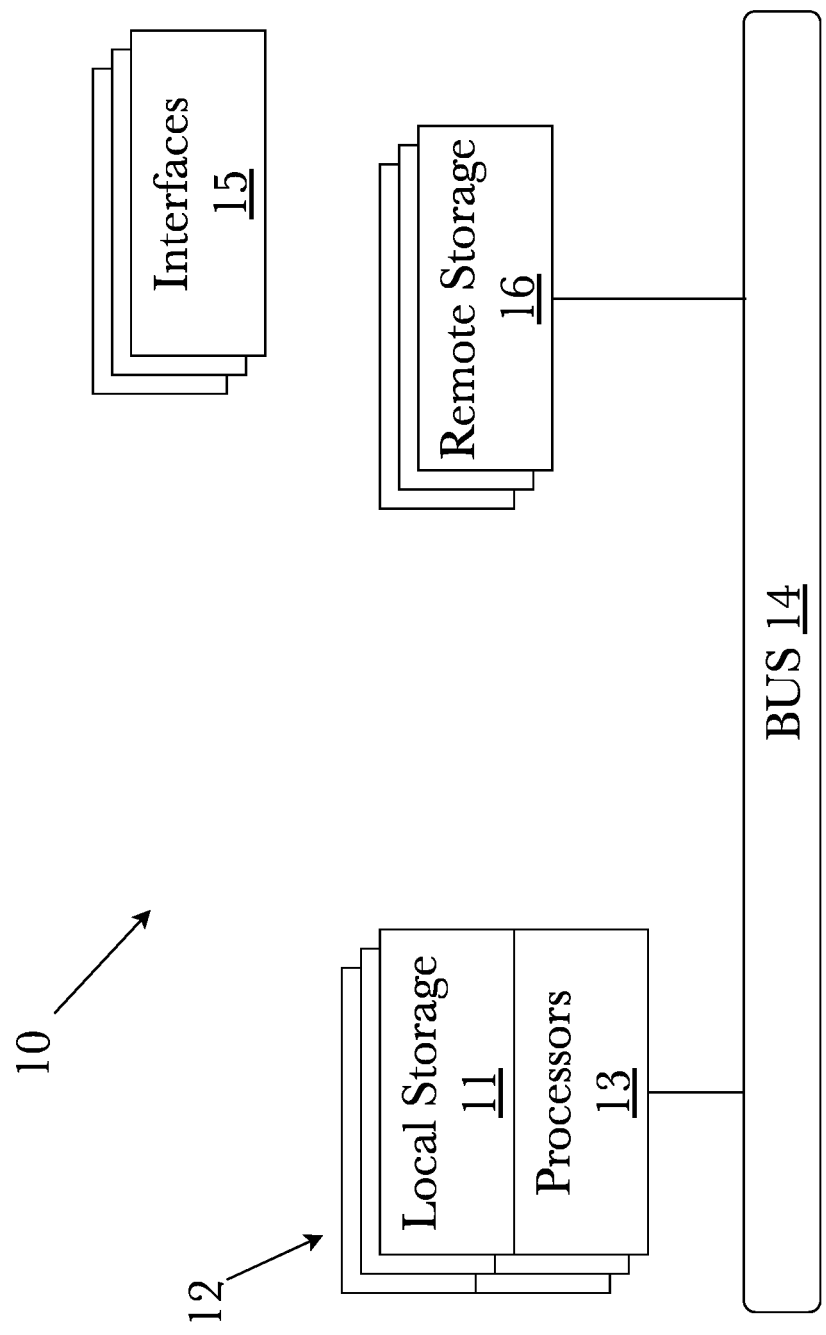
FIG. 36 is a block diagram illustrating an exemplary hardware architecture of a computing device.

Referring now to FIG. 36, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 36 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 37:
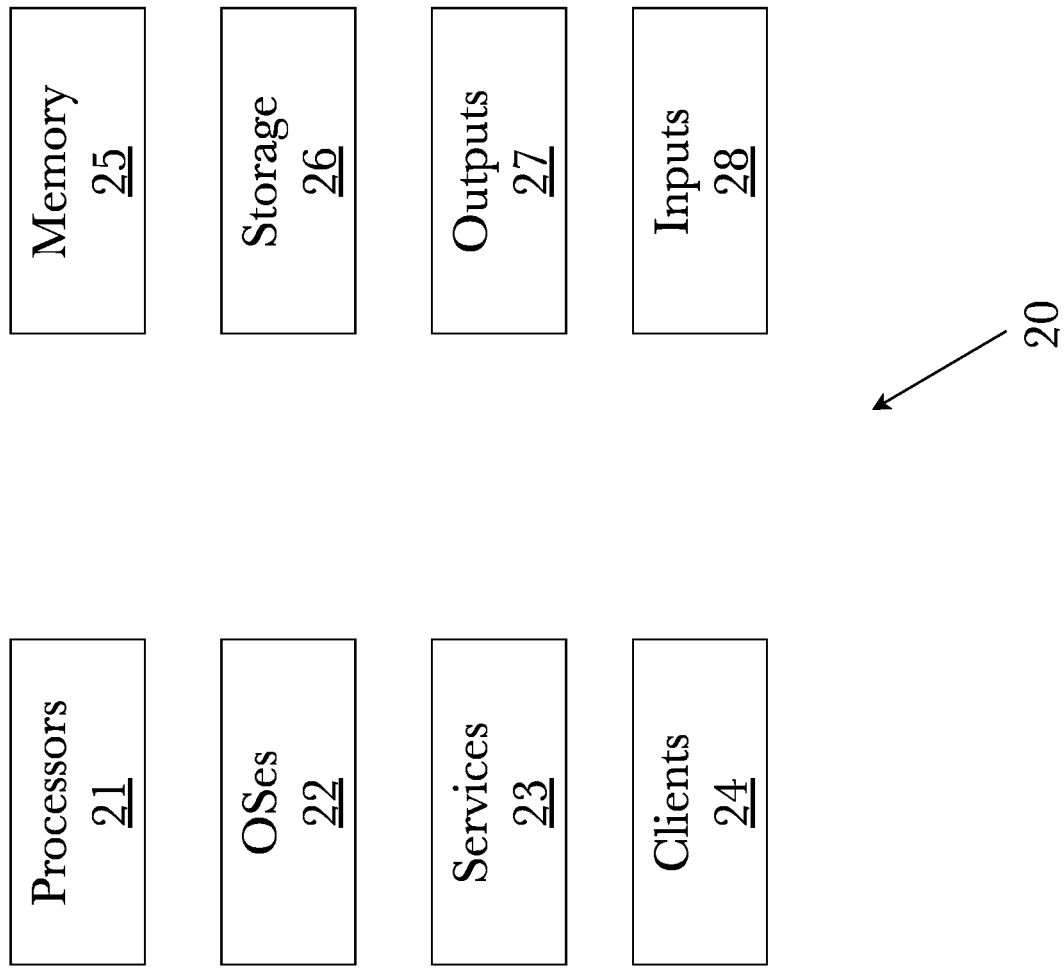
FIG. 37 is a block diagram illustrating an exemplary logical architecture for a client device.

In some aspects, systems may be implemented on a standalone computing system. Referring now to FIG. 37, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 36). Examples of storage devices 26 include flash memory, magnetic hard drive, CD-ROM, and/or the like.

Figure 38:
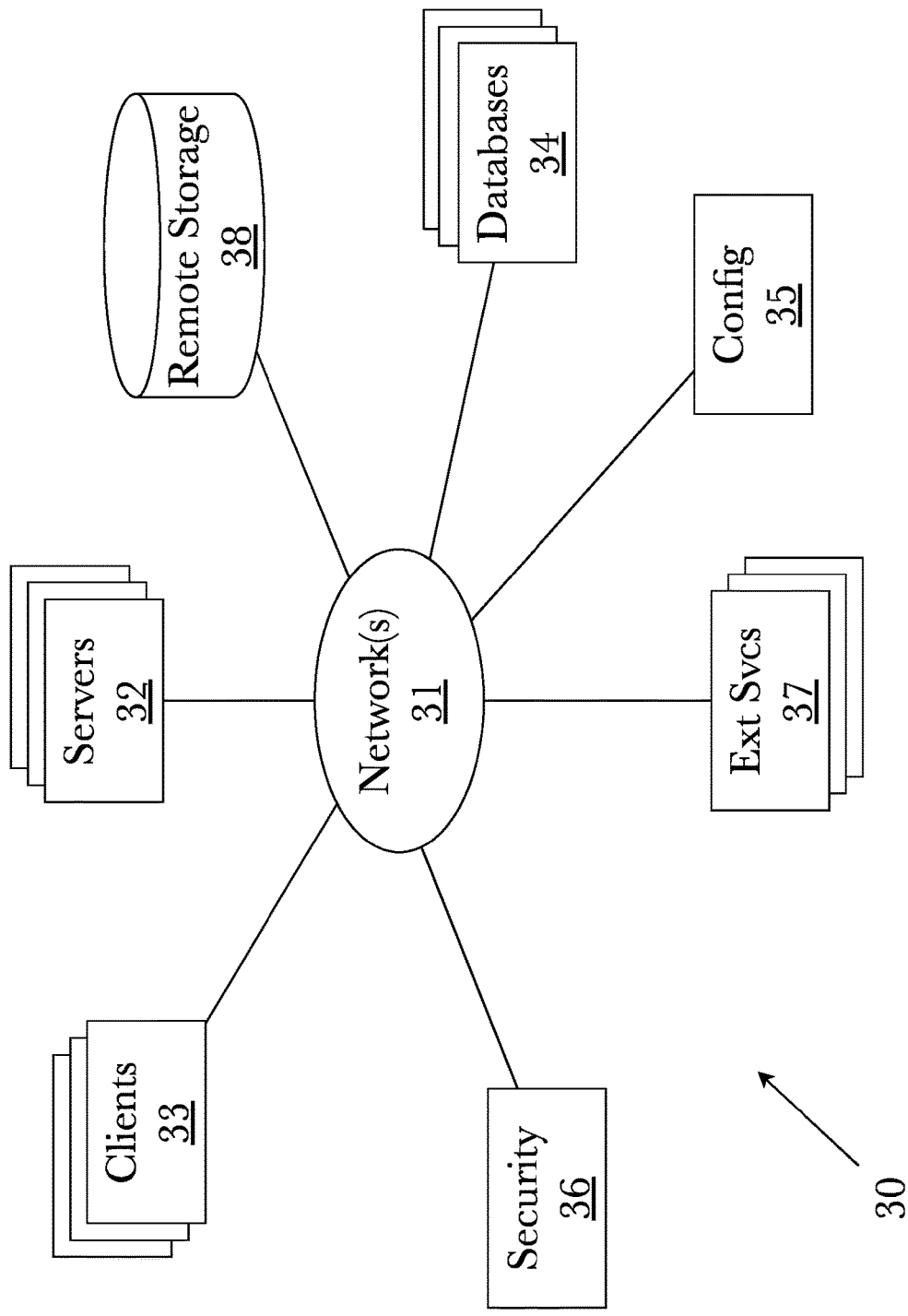
FIG. 38 is a block diagram showing an exemplary architectural arrangement of clients, servers, and external services.

In some aspects, systems may be implemented on a distributed computing network, such as one having any number of clients and/or servers. Referring now to FIG. 38, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 37. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 39:
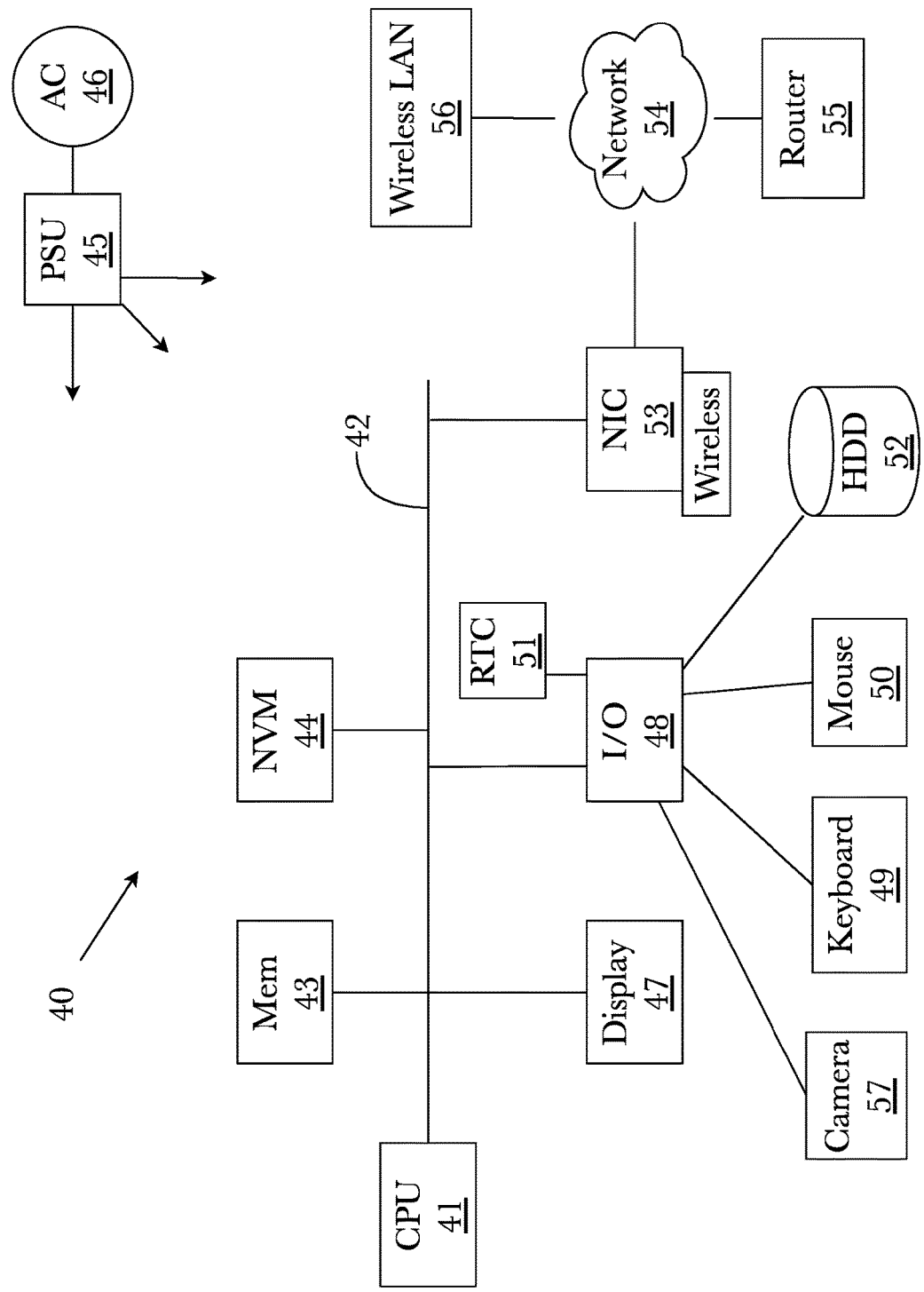
FIG. 39 is another block diagram illustrating an exemplary hardware architecture of a computing device.

FIG. 39 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for error-resilient data reduction, comprising:
   a computing device comprising a memory, a processor, and a non-volatile data storage device;
   a data deconstruction engine comprising a first plurality of programming instructions stored in the memory of, and operating on a processor of, the computing device, wherein the first plurality of programming instructions, when operating on the processor, cause the computing device to:
      train an encoding algorithm on sourceblocks at multiple phases, wherein each phase comprises a distinct starting bit offset of a respective sourceblock;
      deconstruct incoming data into a plurality of chunklets;
      encode the chunklets using the encoding algorithm and a reference codebook; and
      send the encoded chunklets to a data reconstruction engine; and
   a data reconstruction engine comprising a second plurality of programming instructions stored in the memory of, and operating on a processor of, the computing device, wherein the second plurality of programming instructions, when operating on the processor, cause the computing device to:
      decode received chunklets using the key-value pairs stored within the reference codebook;
      for each decoded chunklet, determine if the decoded chunklet has exceeded a predetermined threshold probability that the decoded chunklet was properly encoded, wherein the decoded chunklet is in-phase if the threshold is exceeded and the decoded chunklet is out-of-phase if the threshold is not exceeded; and
      request retransmission of out-of-phase chunklets.

2. The system of claim 1, wherein the threshold probability is determined using logistic regression.

3. The system of claim 1, wherein multiple phases refer to byte-phase sourceblocks with an offset.

4. The system of claim 3, wherein the offset is an integer value in the inclusive range of 1 to 7.

5. A method for error-resilient data reduction, comprising the steps of:
   training an encoding algorithm on sourceblocks at multiple phases, wherein each phase comprises a distinct starting bit offset of a respective sourceblock;
   deconstructing incoming data into a plurality of chunklets;
   encoding the chunklets using an encoding algorithm and a reference codebook;
   decoding the chunklets at a data reconstruction engine using key-value pairs stored within the reference codebook;
   for each decoded chunklet, determining if the decoded chunklet exceeded a predetermined threshold probability that the decoded chunklet was properly encoded, wherein the decoded chunklet is in-phase if the threshold is exceeded and the decoded chunklet is out-of-phase if the threshold is not exceeded; and
   requesting retransmission of out-of-phase chunklets.

6. The method of claim 5, wherein the threshold probability is determined using logistic regression.

7. The method of claim 5, wherein multiple phases refer to byte-phase sourceblocks with an offset.

8. The method of claim 7, wherein the offset is an integer value in the inclusive range of 1 to 7.

* * * * *